US006186848B1

(12) United States Patent
Yotsumoto et al.

(10) Patent No.: US 6,186,848 B1
(45) Date of Patent: Feb. 13, 2001

(54) DISASSEMBLING METHOD OF ELECTRONIC APPLIANCE AND DISASSEMBLING APPARATUS THEREOF

(75) Inventors: Mikio Yotsumoto, Ibaraki; Takayuki Gyobu, Kyoto; Kazumi Takamori, Takatsuki; Yutaka Matsuda, Toyonaka; Kaoru Shimizu, Osaka, all of (JP)

(73) Assignee: Matsushita Electric Industrial Co., Ltd., Osaka (JP)

( * ) Notice: Under 35 U.S.C. 154(b), the term of this patent shall be extended for 0 days.

(21) Appl. No.: 08/896,015

(22) Filed: Jul. 17, 1997

(30) Foreign Application Priority Data

| Jul. 30, 1996 | (JP) | ................................................. 8-199932 |
| Jul. 30, 1996 | (JP) | ................................................. 8-199933 |
| Sep. 6, 1996 | (JP) | ................................................. 8-236337 |
| Sep. 26, 1996 | (JP) | ................................................. 8-254131 |
| Mar. 3, 1997 | (JP) | ................................................. 9-047523 |
| Mar. 6, 1997 | (JP) | ................................................. 9-051335 |
| Mar. 13, 1997 | (JP) | ................................................. 9-058920 |
| Mar. 21, 1997 | (JP) | ................................................. 9-067650 |

(51) Int. Cl.$^7$ ...................................................... H01J 9/00
(52) U.S. Cl. ............................... 445/2; 445/61; 29/564.3
(58) Field of Search ............................ 445/2, 61, 66; 29/281.4, 564.3, 762

(56) References Cited

U.S. PATENT DOCUMENTS

| 4,902,258 | * | 2/1990 | Dunsmore et al. ...................... 445/66 |
| 5,352,142 | * | 10/1994 | Wolf .......................................... 445/2 |
| 5,439,406 | * | 8/1995 | Fuwa et al. ............................... 445/2 |
| 5,466,984 | * | 11/1995 | Gotoh ..................................... 313/482 |

FOREIGN PATENT DOCUMENTS

| 0 542 676 A1 | 5/1993 | (DE) . |
| 43 16 512 C | 9/1994 | (DE) . |
| 44 35 365 A1 | * 3/1996 | (DE) . |
| 0 593 143 A2 | * 4/1994 | (EP) . |
| 0 729 170 A1 | 8/1996 | (EP) . |
| 5-185064 | 7/1993 | (JP) . |
| 5-253550 | 10/1993 | (JP) . |
| 8-064140 | * 3/1996 | (JP) . |
| 8-185800 | 7/1996 | (JP) . |
| 8-185801 | 7/1996 | (JP) . |

OTHER PUBLICATIONS

P. Koch, et al., "Dismantling and Process Technology for Electronic Scrap and Discarded Electric Appliances", Aufbereitungs Technik, vol. 37, No. 5, May 1996 (1996–05), pp. 211–220.

* cited by examiner

Primary Examiner—Kenneth J. Ramsey
(74) Attorney, Agent, or Firm—McDermott, Will & Emery

(57) ABSTRACT

It is an object of the invention to present a disassembling method and disassembling apparatus for disassembling easily an electronic appliance having a housing, and electronic components such as cathode-ray tube accommodated in the housing, classifying without mixing of impurities, and recycling at low cost by automating. An electronic appliance having a housing, a cathode-ray tube, and plural electronic components is put on a conveying pallet, and it is transferred by a conveyor. The conveyed electronic appliance is put on a tiltable work bench, a back plate of the housing is removed, and an opening is formed. Blowing a high pressure air shower to the opening, dust deposits on the electronic components are removed and cleaned. Moreover, other side of the housing is processed into a U-form by end mill, and a further opening is formed, and the cathode-ray tube is taken out through this further opening. The metal band of the dismounted cathode-ray tube is heated by high frequency induction, and the metal band is removed. The adhesive applied on the cathode-ray tube is removed by using a rotary brush having metal wires. Still more, judging whether a safety panel is installed at the front side of the cathode-ray tube or not by using distance sensors, the safety panel is classified. Such disassembling process is executed by using an automated disassembling apparatus.

85 Claims, 31 Drawing Sheets

Fig. 3

Discarded TV disassembling and recycling flow

Step 1:
Loading device — Discarded TV is mounted on conveying pallet and sent out Step 2:
Tilting device — Of the two tilting deices, the conveying pallet is delivered into the side in which conveying pallet is not delivered yet, and the worker detaches the back cover of the TV.

Step 3:
Cleaning device — Dust collected in discarded TV is removed by air blow.

Step 4:
Tilting device — Accessories (DY, etc.) of CRT are detached and distributed into the following:
1. Wooden cabinet to bottom plate cutting device
2. Formed cabinet is rid of chassis and sent to next process.
3. The set taking much time in disassembling is sent to special set disassembling process.

Step 5:
Bottom plate cutting device — Bottom plate of wooden cabinet is cut in U-form. For the ease of dismounting of CRT.

Step 6:
CRT removing device — Removing tightening screws, the CRT is taken out. Peripheral parts (grounding wire, demagnetization coil, etc.) are removed. Cabinet, removed parts and CRT are sent to next process on conveying pallet.

Step 7:
CRT transfer device — Discarded cabinet and parts on conveying pallet are discarded on discarding conveyor CRT is taken out in CRT transfer device, and sent to CRT processing step.

Step 8:
Electron gun cutting device — Electron gun is cut by disk-shaped wheel, and set to recycling process. CRT is transferred onto conveying pallet.

Step 9:
Metal band removing device — Implosion preventive metal band around CRT is removed by high frequency heating.

Step 10:
Double panel measuring device — Inspection of presence or absence of safety glass adhered to panel surface. CRT with safety glass is sorted and sent to other process.

Step 11:
Automatic CRT cleaning device — Peeling and removing adhesive, tape, etc. of implosion preventive metal band.

Step 12:
CRT transfer device — To CRT separating process to separate into panel and funnel.

(A)

(B)

DISASSEMBLING METHOD OF ELECTRONIC APPLIANCE AND DISASSEMBLING APPARATUS THEREOF

TECHNICAL FIELD OF THE INVENTION

The present invention relates to a disassembling method and disassembling apparatus of electronic appliances such as video appliances and audio appliances for disposal or regeneration.

BACKGROUND OF THE INVENTION

For the purpose of effective use of resources and conservation of the global environments, various electronic appliances such as television receivers and personal computer display devices are disassembled, classified by the variety of materials, and regenerated.

As a regeneration processing method, a disassembling method of television receiver is disclosed in Japanese Laid-open Patent Publication No. 5-185064.

Japanese Laid-open Patent Publication No. 5-185064 describes a method of cutting off the neck of a cathode-ray tube, a method of disassembling into shadow mask, funnel glass, and panel, a method of removing the phosphor material applied on the panel surface by cleaning, and a method of crushing the glass portion.

In Japanese Laid-open Patent Publication No. 5-185064, however, nothing is mentioned about a method of separating the cathode-ray tube from the housing, a method of disassembling the metal band for prevention of implosion installed around the cathode-ray tube, or a method of removing the adhesive member used for the purpose of shock absorption and adhesion of the metal band.

It is hence an object of the invention to present a disassembling method and disassembling apparatus for easily disassembling electronic appliances such as video appliances and audio appliances, classifying without allowing mixture of impurities, and recycling at low cost by automation.

SUMMARY OF THE INVENTION

The disassembling method of electronic appliance of the invention is a disassembling method of an electronic appliance having a housing and plural electronic components installed in the housing, comprising:

a step of conveying the electronic appliance having the housing and the plural electronic components installed in the housing by a first conveyor, a step of separating the electronic appliance conveyed by the conveyor into the housing, a cathode-ray tube of the plural electronic components, and other electronic components of the plural electronic components, at least on one of the conveyor and a work bench installed near the conveyor, and a step of conveying at least one of the separated housing and the plural electronic components by a second conveyor.

Specifically, the disassembling method of the invention comprises at least two steps of the following steps:

(a) a step of conveying the electronic appliance having a cathode-ray tube of the plural electronic components by a conveyor, (b) a step of transferring the electronic appliance conveyed by the conveyor onto a tiltable first work bench, (c) a step of tilting the first work bench so that the forward side may be lower, (d) a step of removing a portion of the housing from the electronic appliance mounted on the tilted work bench, and forming a first opening, (e) a cleaning step of blowing air shower to the plural electronic components through the first opening, and removing dust deposits from the plural electronic components, (f) a step of transferring the electronic appliance on a tiltable second work bench, (g) a step of tilting the second work bench so that the forward side may be lower, (h) a step of disassembling and taking out at least one of said plural electronic components from said electronic appliance mounted on said tilted second work bench, (i) a step of cutting the bottom plate of the housing having the cathode-ray tube into a U-form through the first opening, and forming a second opening, (j) a step of separating the cathode-ray tube from the housing by working from the second opening, (k) a step of heating a metal band installed around the cathode-ray tube by high frequency so as to expand, and removing the expanded metal band from the cathode-ray tube, (l) a step of rotating the cathode-ray tube, fitting a rotary brush to the side of the outer circumference of the rotating cathode-ray tube, and removing the deposit adhered to the circumference of the cathode-ray tube in the mark left over by the removed metal band, by the rotary brush, (m) a step of distinguishing whether said separated cathode-ray tube has a safety panel at its front side or not, (n) a step of classifying into cathode-ray tubes having said safety panel and cathode-ray tubes not having said safety panel, (o) a step of cutting the circumference of display unit of the cathode-ray tube not having the safety panel into a groove form, heating, and separating the display unit from the cathode-ray tube, and (p) a step of separating at least the one electronic component of taken out of the electronic appliance in a different step.

In this constitution, it is easier to classify into the housing and electronic components, and therefore mixing of electronic components into the disassembled housing can be prevented. Moreover, automation of disassembling procedure of electronic appliance is realized. As a result, the disassembling cost is reduced, the recycling efficiency of housing and electronic components is enhanced, which contributes to preservation of environments and effective use of resources.

The disassembling method of an electronic appliance of the invention is a disassembling method of an electronic appliance having a housing including a plate forming at least one side selected from the group consisting of top, bottom and side, and plural electronic components installed in the housing, comprising:

(a) a step of processing the plate by at least one process selected from the group consisting of end mill processing, laser processing, and water jet processing, and cutting and separating, and (b) a step of removing a part of the separated plate, and forming an opening.

Preferably, at least the one plate of the top, bottom and side is cut nearly in an U-form.

Preferably, it further comprises:
  (c) a step of disassembling at least one of the plural electronic components through the opening, and taking out the disassembled electronic component.

In this constitution, it is easier to classify into the housing and electronic components, and therefore mixing of electronic components into the disassembled housing can be prevented. Moreover, automation of disassembling procedure of electronic appliance is realized. As a result, the recycling efficiency of housing and electronic components is enhanced, which contributes to preservation of environments and effective use of resources.

The disassembling method of an electronic appliance of the invention is a disassembling method of an electronic appliance having a housing including a plate forming at least one side selected from the group consisting of top, bottom and side, and plural electronic components installed in the housing, comprising:
  (a) a step of cutting the plate by at least one side of the top, bottom and side, and separating, and
  (b) a step of removing a part of the separated plate, and forming an opening.

Preferably, it further comprises:
  (c) a step of removing a back cover from the housing, and forming other opening,
  wherein the plate of the bottom at the step (a) is cut in a U-form through the other opening by end mill processing.

Preferably, the plate is cut in the U-form through at least one of a first ridge portion at intersection of the top and the side, and a second ridge portion at intersection of the bottom and the side.

Preferably, the plural electronic components include a cathode-ray tube of a television receiver, and a coupling member for coupling the cathode-ray tube, further comprising:
  (c) a step of taking out the cathode-ray tube through the opening.

Preferably, the plural electronic components include a cathode-ray tube of a television receiver, and a coupling member for coupling the cathode-ray tube, further comprising:
  (c) a step of taking out the coupling member through the opening, and
  (d) a step of taking out the cathode-ray tube from the opening after removing the coupling member.

In this constitution, it is easier to classify an electronic appliance having a housing, a cathode-ray tube, and electronic components, and in particular disassembling of cathode-ray tube becomes easier. Moreover, automation of disassembling procedure of electronic appliance is realized. As a result, the recycling efficiency of housing and electronic components is enhanced, which contributes to preservation of environments and effective use of resources.

The disassembling method of an electronic appliance of the invention is a disassembling method of an electronic appliance having a cathode-ray tube, and a metal band installed around the cathode-ray tube, comprising:
  (a) a step of heating the metal band by high frequency, and
  (b) a step of taking out the metal band from the cathode-ray tube,
  wherein the metal band is expanded by heating of the metal band, and the metal band is separated from the cathode-ray tube by expansion of the metal band.

Preferably, the step of high frequency heating is a step of heating by using high frequency induction heating means, and the output of the high frequency induction heating means is in a range of about 2 kW to about 60 kW.

Preferably, high frequency heating is executed while applying a pressing load to the metal band in the step of high frequency heating.

Preferably, high frequency heating is executed while applying a pressing load in a range of about 4 kg to about 40 kg to a tab fitted to the metal band in the step of high frequency heating.

Preferably, high frequency heating is executed while applying a pressing load to a tab fitted to the metal band, while supporting the front side of the cathode-ray tube, in the step of high frequency heating.

Preferably, the electronic appliance further includes a resin member installed between the cathode-ray tube and the metal band, the resin member is softened and metal band is expanded as the metal band is heated, and the metal band is separated from the cathode-ray tube by softening of the resin member and expansion of the metal band.

Preferably, it further comprises:
  (c) a step of fitting a rotary brush to contact with deposit adhering to the circumference of the cathode-ray tube in the mark left over by the removed metal band, and removing the deposit from the cathode-ray tube.

Preferably, the rotary brush has plural metal wires, and the deposit is moved from the cathode-ray tube to adhere to the ends of the plural metal wires, and removed.

Preferably, it further comprises:
  (d) a step of fitting a dresser to contact with the deposit adhered to the ends of the metal wires of the rotary brush, shaving off the ends of the rotary brush, and removing the deposit from the metal wires.

Preferably, the dresser is formed of a ceramic material having a stiffer property than the metal wires.

In this constitution, it is easier to disassemble the cathode-ray tube having a metal band through an adhesive member. Moreover, automation of disassembling procedure of cathode-ray tube is realized. As a result, the recycling efficiency of cathode-ray tube is enhanced, which contributes to preservation of environments and effective use of resources.

The disassembling method of an electronic appliance of the invention is a disassembling method of an electronic appliance having a cathode-ray tube, comprising:
  (a) a distinguishing step of distinguishing whether a safety panel is installed or not at the front side of the cathode-ray tube, and
  (b) a step of classifying into cathode-ray tubes having the safety panel and cathode-ray tubes not having the safety panel, according to the distinguishing step.

Preferably, the distinguishing step is characterized by distinguishing presence or absence of the safety glass by measuring the distance from a distance sensor installed in the forward direction of a fluorescent screen of the cathode-ray tube to the fluorescent screen.

Preferably, the distinguishing step is characterized by distinguishing presence or absence of the safety glass by measuring the distance from a distance sensor installed in the forward direction of a fluorescent screen of the cathode-ray tube to the fluorescent screen, and by measuring the size of the fluorescent screen of the cathode-ray tube.

Preferably, the distinguishing step is executed by mounting a fluorescent screen of the cathode-ray tube on a pallet having an opening, so that part of the fluorescent screen may coincide with the opening.

Preferably, it further comprises:
  (c) a step of mounting cathode-ray tubes having the safety panel and cathode-ray tubes not having the safety panel on other different conveyors respectively.

In this constitution, it is easier to disassemble the cathode-ray tube having a safety panel. Moreover, automation of disassembling procedure of cathode-ray tube having safety panel is realized. As a result, the recycling efficiency of safety panel and cathode-ray tube is enhanced, which contributes to preservation of environments and effective use of resources.

The disassembling method of an electronic appliance of the invention is a disassembling method of an electronic appliance having a housing and plural electronic components installed in the housing, comprising:
(a) a step of mounting the electronic appliance in a container having high pressure gas injection means and exhaust means, and
(b) a cleaning step for removing dust deposits on the plural electronic components in the container.

Preferably, the cleaning step is a step of blowing air shower from the high pressure gas injection means to the electronic appliance to separate the dust from the electronic components, and removing the separated dust by the exhaust means.

Preferably, the electronic appliance is mounted on a conveying pallet mounted on a conveyor.

In this constitution, it is easier to remove dust deposits from the housing and electronic components in the housing. Therefore, dust is not left over in the disassembled housing and electronic components. As a result, the purity of recycling of housing and electronic components is enhanced, which contributes to preservation of environments and effective use of resources.

The disassembling method of an electronic appliance of the invention is a disassembling method of an electronic appliance having a housing and plural electronic components installed in the housing, comprising:
(a) a step of transferring the electronic appliance conveyed on a conveyor onto a tiltable work bench,
(b) a step of tilting the work bench so as to be lover at the front side, and
(c) a step of disassembling the electronic appliance mounted on the tilted work bench.

Preferably, the step of disassembling the electronic appliance is a step of detaching at least part of the housing from the electronic appliance, and forming an opening.

Preferably, it further comprises:
(d) a cleaning step of removing dust deposits from the electronic components through the opening.

Preferably, it further comprises:
(e) a step of mounting the electronic appliance having the opening on other tiltable work bench, tilting the other work bench, and removing at least one of the plural electronic components being rid of the dust through the opening.

Preferably, it further comprises:
(f) a step of processing a bottom plate of the housing by end mill, cutting, and forming other opening.

Preferably, one of the others of the plural electronic components has a cathode-ray tube and a metal band installed around the cathode-ray tube, and further comprising:
(g) a step of heating the metal band at high frequency and removing the metal band.

Preferably, the cathode-ray tube has a safety panel installed at the front side of the cathode-ray tube, and further comprising:
(h) a step of distinguishing presence or absence of installation of the safety panel.

Preferably, the step of distinguishing presence or absence of installation of the safety panel is characterized by measuring, using distance sensor, the distance from a fluorescent screen of the cathode-ray tube to the distance sensor installed in the forward direction of the fluorescent screen.

Preferably, it further comprises:
(i) a step of fitting a rotary brush to contact with the rotating cathode-ray tube, and removing deposits from the circumference of the cathode-ray tube.

Preferably, it further comprises:
(j) a step of cutting the cathode-ray tube by a disk grinder, and removing an electron gun from the cathode-ray tube.

Preferably, the conveyor has a conveying pallet mounted on the conveyor, and the electronic appliance is mounted on the conveying pallet.

In this constitution, the disassembling work of housing and electronic components is facilitated. Moreover, classification into housing and electronic components is easy and automated. Disassembling of electronic appliance having cathode-ray tube is easy and automated. Disassembling of metal band installed around the cathode-ray tube is easy and automated. Removal of adhesive and other deposits on the cathode-ray tube is easy and automated. It is easy to distinguish whether safety panel is installed in the cathode-ray tube or not, and disassembling of safety panel and cathode-ray tube is easy and automated. Mixing of dust into disassembled housing and electronic components can be prevented. Mixing of electronic components into disassembled housing can be prevented. Disassembling work of electronic appliance is automated, and mass processing is realized. Recycling of individual disassembled housing and electronic components is easy. As a result, the disassembling cost is lowered, the recycling efficiency of housing and electronic components is enhanced, which contributes to preservation of environments and effective use of resources.

The disassembling apparatus of an electronic appliance of the invention is a disassembling apparatus of an electronic appliance having a housing and plural electronic components installed in the housing, comprising:
a first conveyor for conveying the electronic appliance,
separating means for separating the electronic appliance into housing and plural electronic components, and
a second conveyor for conveying at least one of the separated housing and plural electronic components.

More specifically, the disassembling apparatus of an electronic appliance comprises at least two of the following constituent elements:
(a) a pallet for mounting and conveying an electronic appliance having a housing and plural electronic components installed in the housing,
(b) a first conveyor for conveying the pallet,
(c) a tiltable work bench installed near the first conveyor, having a frame, a small conveyor installed on the frame, a stopper formed on the frame, and automatic tilting means for tilting the frame about one end of the frame,
(d) a cleaning device for generating an air shower for removing dust deposits from the plural electronic components,
(e) cutting means for cutting off a bottom plate of the housing by end mill processing, and forming an opening in the housing,
(f) a removing device for dismounting the metal band from the cathode-ray tube, with the electronic components including a cathode-ray tube and a metal band installed around the cathode-ray tube, (g) a distinguishing device for judging whether a safety panel is installed or not at the front side of the cathode-ray tube, (h) a removing means for removing deposits from the circumference of the cathode-ray tube, (i) a dresser device for removing deposits from the tip of rotary brush of the removing device, and (j) a second conveyor for conveying the electronic components disassembled from the electronic appliance.

In this constitution, the housing and electronic components can be securely classified from the electronic appliance having the housing and electronic components. Moreover, an automated disassembling apparatus of electronic appliance is obtained. As a result, the disassembling cost is reduced, the recycling efficiency of the disassembled housing and electronic components is enhanced, which contributes to preservation of environments and effective use of resources.

The disassembling apparatus of an electronic appliance of the invention comprises:

(a) a conveyor for conveying an electronic appliance including a housing having at least one selected from the group consisting of top plate, bottom plate and side plate, and plural electronic components installed in the housing, and (b) cutting and processing means for cutting at least one selected from the group consisting of the top plate, bottom plate, and side plate, and separating, and opening.

Preferably, it further comprises:

(c) a conveying pallet mounted on the conveyor, and the electronic appliance is conveyed as being mounted on the conveying pallet.

Preferably, the cutting and processing means is at least one selected from the group consisting of end mill processing, laser processing, and water jet processing.

Preferably, the cutting and processing means is end mill processing, and the bottom plate is cut by the end mill processing.

Preferably, it further comprises:

(d) establishing means for establishing the position of the conveyed electronic appliance.

Preferably, it further comprises:

(e) measuring means for measuring the position of the established electronic appliance.

Preferably, the measuring means is at least one of laser sensor and ultrasonic sensor.

Preferably, the measuring means has a role of measuring the position in each direction of mutually intersecting X-axis, Y-axis and Z-axis.

In this constitution, the housing and electronic components can be securely classified from the electronic appliance having the housing and electronic components. Moreover, an automated disassembling apparatus of electronic appliance is obtained. The cutting position of the housing can be established accurately. Cutting process of housing is automated, so that the housing can be cut and processed securely. As a result, the recycling efficiency of the disassembled housing and electronic components is enhanced, which contributes to preservation of environments and effective use of resources.

The disassembling apparatus of an electronic appliance of the invention comprises:

(a) means for feeding an electronic appliance including electronic components, a cathode-ray tube, and a metal band installed around the cathode-ray tube, (b) pressing means for applying a pressing load to the metal band, and (c) high frequency heating means for heating the metal band, wherein the metal band is expanded as the metal band is heated, and the metal band is separated from the cathode-ray tube along with expansion and pressing of the metal band.

Preferably, the high frequency heating means is high frequency induction heating means.

Preferably, the high frequency heating means includes a high frequency induction coil, and further comprising:

(d) lifting means for lifting the cathode-ray tube to the inside height of the high frequency induction coil, wherein the metal band is heated by induction heat by the high frequency induction coil.

Preferably, the means for feeding the electronic appliance is conveying means having a conveying pallet, and the electronic appliance is mounted on the conveying pallet.

In this constitution, the cathode-ray tube and metal band can be securely classified from the electronic appliance having electronic components, cathode-ray tube, and metal band installed around the cathode-ray tube. Moreover, an automated disassembling apparatus of metal band is obtained. The metal band can be easily separated from the cathode-ray tube. As a result, the recycling efficiency of the disassembled metal band and cathode-ray tube is enhanced, which contributes to preservation of environments and effective use of resources.

The disassembling apparatus of an electronic appliance of the invention comprises:

(a) a first conveyor for conveying an electronic appliance including a first cathode-ray tube not having safety panel, and a second cathode-ray tube having a safety panel in the forward direction of a fluorescent screen, and (b) a distinguishing device for distinguishing the first cathode-ray tube not having the safety panel from the second cathode-ray tube having the safety panel.

Preferably, the distinguishing device includes a distance sensor installed in a further forward direction of the forward direction of the fluorescent screen, the distance sensor has a function of measuring the distance from the distance sensor to the fluorescent screen, and the first cathode-ray tube not having the safety panel from the second cathode-ray tube having the safety panel are distinguished by the distance from the distance sensor to the fluorescent screen.

Preferably, the distance sensor is a sensor making use of at least one of laser beam and ultrasonic wave.

Preferably, it further comprises:

(c) a pallet forming an opening for mounting the electronic appliance on, wherein the fluorescent screen of the first cathode-ray tube and the fluorescent screen of the second cathode-ray tube are mounted on the pallet having the opening, in a state so that part of the fluorescent screen may coincide with the opening.

Preferably, the distinguishing device includes a distance sensor installed in a further forward direction of the forward direction of the fluorescent screen, and size measuring means for measuring the size of the fluorescent screen, installed in the direction of each side of the first cathode-ray tube and the second cathode-ray tube, and the first cathode-ray tube not having the safety panel and the second cathode-ray tube having the safety panel are distinguished on the basis of the data measured by the distance sensor and the size measuring means.

In this constitution, it is easy to distinguish whether the cathode-ray tube has a safety panel or not, and the safety panel and cathode-ray tube can be classified easily. Moreover, it is automatically distinguished whether the cathode-ray tube has a safety panel or not. The size of the cathode-ray tube can be distinguished easily. As a result, the recycling efficiency of the disassembled safety panel and cathode-ray tube is enhanced, which contributes to preservation of environments and effective use of resources.

The disassembling apparatus of an electronic appliance of the invention comprises:

(a) a conveyor for conveying an electronic appliance having plural electronic components, (b) a tiltable work bench installed near the conveyor, and (c) transfer means for transferring the electronic appliance conveyed by the conveyor onto the work bench, wherein the worker executes the disassembling work with the work bench tilted at a specified angle.

Preferably, it further comprises:

(d) a conveying pallet, wherein the electronic appliance is conveyed as being mounted on the conveying pallet.

Preferably, the work bench includes a tiltable frame, tilting means for tilting the frame, and a small conveyor installed on the frame, the electronic appliance is transferred onto the small conveyor, and the electronic appliance mounted on the small conveyor is tilted when the frame is tilted.

Preferably, the tilting means has a support shaft at one end of the frame, and elevatable automatic tilting means at other end.

Preferably, the frame has a stopper, and the stopper has a function for preventing the electronic appliance from dropping out when the frame is tilted.

In this constitution, it is easy to disassemble the electronic appliance. The disassembling work corresponding to the sizes of the electronic appliance is realized. An automated disassembling apparatus of electronic appliance is obtained. The operation for tilting the work bench is automated, and the disassembling work is facilitated.

The disassembling apparatus of an electronic appliance of the invention comprises:

(a) a conveyor for conveying an electronic appliance having plural electronic components, and (b) a cleaning device for removing dust deposits from the electronic appliance.

Preferably, the cleaning device has means for injecting an air shower, and the air shower blows off and removes the dust from the electronic appliance.

Preferably, the cleaning device includes a cover body to be installed so as to cover the electronic appliance mounted on the conveyor, means for injecting an air shower in the cover body, and an exhaust duct for sucking and removing separated dust, the air shower blows off and separates the dust from the electronic appliance covered by the cover body, and the separated dust is removed from the exhaust duct.

In this constitution, it is easy to remove dust deposits from the electronic components and electronic appliance. Moreover, dust removal is automated. Since dust can be removed on the conveyor, dust removal operation is rapid. Since the disassembled electronic components and casing are free from dust, the recycling efficiency of electronic components is enhanced, which contributes to preservation of environments and effective use of resources.

The disassembling apparatus of an electronic appliance of the invention comprises:

(a) a conveyor for conveying an electronic appliance having a cathode-ray tube, and (b) a rotary brush installed so as to contact with the circumference of the cathode-ray tube for removing deposits adhering to the cathode-ray tube.

Preferably, the rotary brush is a plurality of rotary brushes, and each one of the plurality of rotary brushes is installed at a specific interval on the circumference of the cathode-ray tube so as to contact with each other.

Preferably, the rotary brush has plural metal wires installed radially.

Preferably, it further comprises:

(c) rotating means for rotating while supporting the cathode-ray tube, wherein the rotary brush contacts with the deposits adhered on the circumference of the cathode-ray tube, while rotating the cathode-ray tube, thereby removing the deposits.

Preferably, it further comprises:

(d) a dresser for removing the deposits adhering to the tip of the rotary brush along with removal of the deposits, wherein the tip of the rotary brush having deposits contacts with the dresser, and the tip of the rotary brush is shaved off, and the deposits are removed at the same time.

Preferably, the dresser is formed of a ceramic material having a stiffer property than the metal wires.

In this constitution, it is easy to remove adhesive and other deposits adhering to the cathode-ray tube. Moreover, removal of such deposits is automated. The cathode-ray tube free from impurities is obtained, so that the subsequent processing of cathode-ray tube is easy. As a result, the recycling efficiency of glass and others for composing the cathode-ray tube is enhanced, which contributes to preservation of environments and effective use of resources.

BRIEF DESCRIPTION OF THE DRAWINGS

FIG. 3 is a flowchart of FIG. 1.

KEY TO REFERENCE NUMERALS AND SYMBOLS

Figure 1:
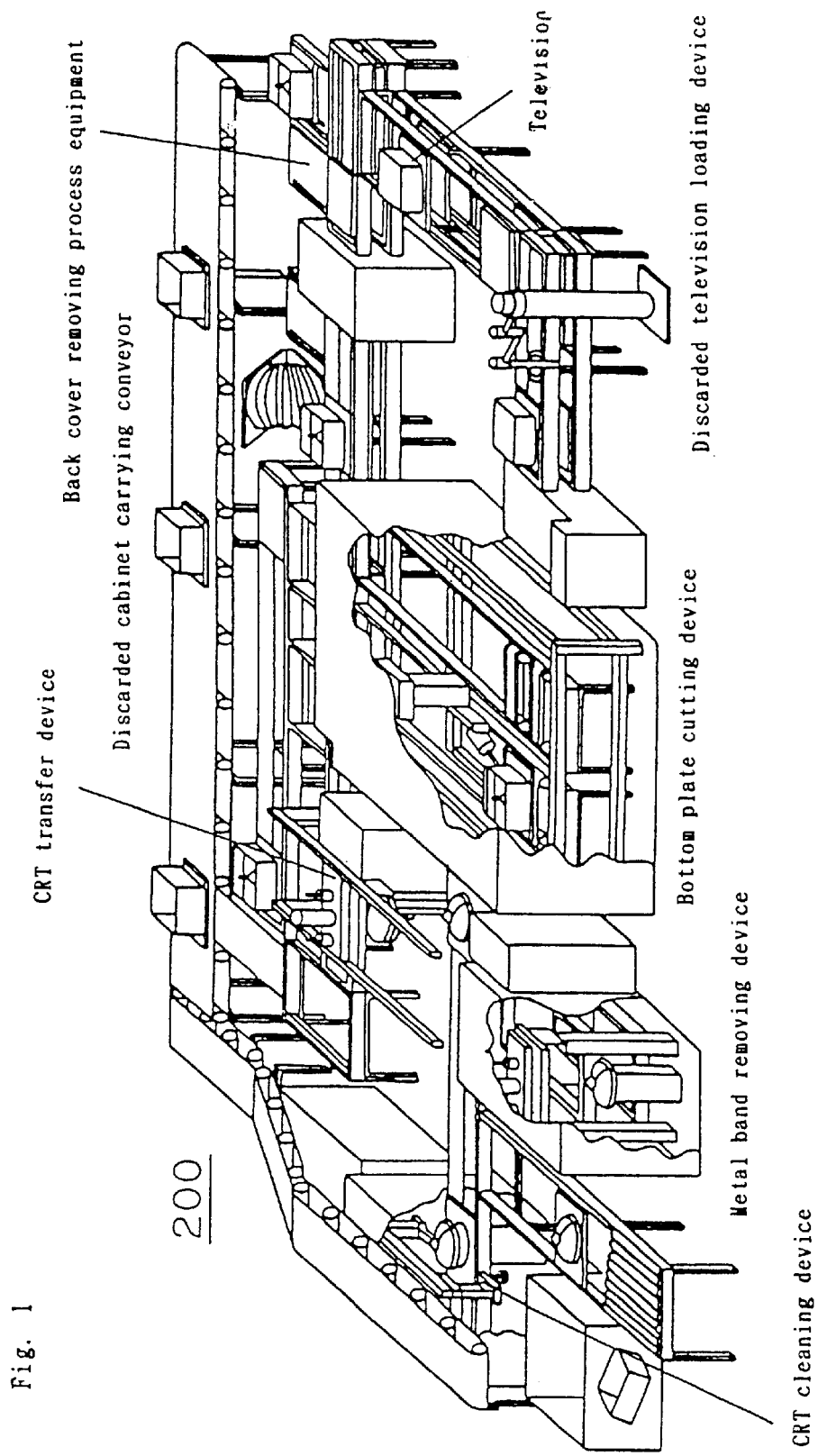
FIG. 1 is a conceptual block diagram of a disassembling apparatus of an electronic appliance in an embodiment of the invention.

1 Conveyor (conveying pallet transfer means)
2 Conveying pallet
2A, 2B Conveying pallets
3 X-axis direction positioning means (for establishing position)
4, 7, 9 Air cylinders
5, 8, 10 Plates
6 Y-axis direction positioning means (for establishing position)
11 Robot
12 Rotary driving means
13 Cutting tool (end mill)
14 X-axis direction sensor
15 Y-axis direction sensor
16 Z-axis direction sensor
21 Tab pressing means
21A T-form plate tab pressing means
22 CRT support means (support member)
23 CRT lifting means
24 High frequency heating device (high frequency induction heating device)
25 Induction heating coil
27A, 27B Penetration holes
26 Elastic member
28 Elastic member piece
29 Annular recess
31 Frame
32 Stopper
33 Drive cylinder
34 Base frame
35 Bearing
36, 37, 38 Shafts
39 Conveying belt
40 Work bench
45 Cleaning device
46 Enclosed box
47 Spray nozzle
48 Exhaust duct
49 Air shower
50 Housing
51 CRT (cathode-ray tube)
52 Chassis (control circuit unit)
53, 57 Printed wiring boards
54 Antenna terminal board
55 Speaker device
56 Tuner
58 Metal band for prevention of implosion (metal band)
59 Mounting metal piece (tab)
60 Cutting groove
61 Brush
63 CRT side wall
64 Coolant feed means
67 Deposit
70 Deposit removing device
72 Adhesive tape (including adhesive agent)
73 Brush
74 Brush rotating motor
75 CRT suction pad
76 CRT rotating motor
77 Lifting unit
78 Brush support arm
79 Brush moving cylinder
80 Cleaning chamber
82 Tape recovery box
83 Recovery box moving cylinder
84 CRT pressing cylinder
85 Exhaust duct
91 Penetration hole
92 Data carrier (data memory means)
93, 94 Distance sensors
95 Measuring unit
100 Television receiver
100A Television receiver (large-sized cabinet)
101 Cabinet
102 Back cover
103 CRT
200 Disassembling apparatus

DETAILED DESCRIPTION OF THE PREFERRED EMBODIMENTS

Referring now to the drawings, a processing method of a disassembling apparatus of an electronic appliance in an embodiment of the invention is described below. For the sake of convenience, the electronic appliance is represented by an example of a television receiver.

Figure 2:
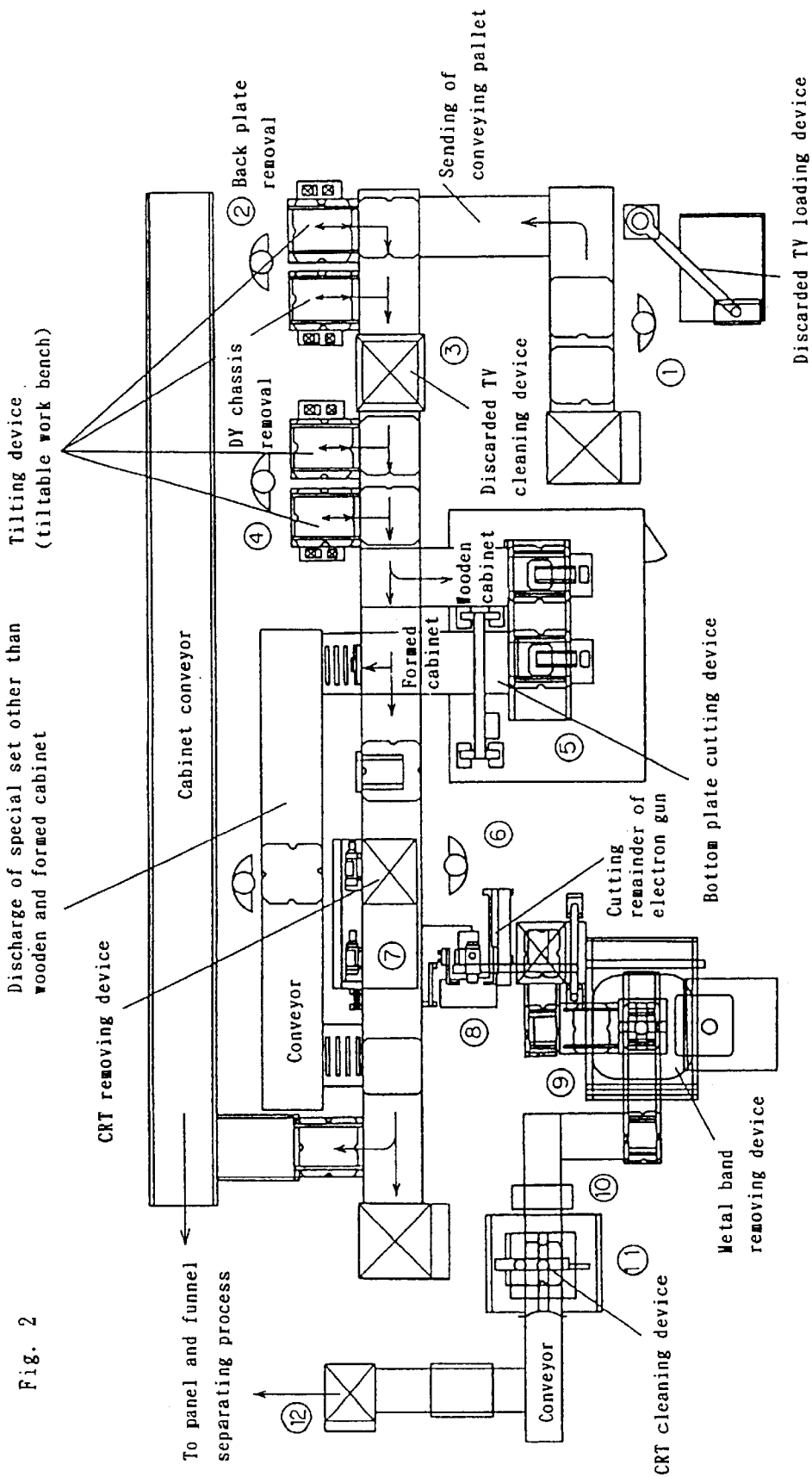
FIG. 2 is a plan view of FIG. 1.

FIG. 1 is a conceptual block diagram of a disassembling apparatus of an electronic appliance in an embodiment of the invention. FIG. 2 is a plan view of FIG. 1. FIG. 3 is a flowchart of FIG. 1.

In FIG. 1 through FIG. 3, the television receiver is mounted on a conveying pallet, and is conveyed from the lower right corner to the upper left corner in FIG. 1 by the conveyor, for example, chain conveyors stretched parallel. In the conveying process, the steps from removal of back cover to peeling and removal of adhesive tape are half automated. Each step of the process shown in FIG. 3 is described below. Reference numerals 1 to 12 shown in FIG. 2 refer to the step numbers.

(a) Step 1: Loading device

At step 1, a discarded television receiver is discharged by mounting on a conveying pallet by means of a loading device. In this embodiment, it is mounted on the conveying pallet manually. Of course, it is possible to detect automatically a discarded television receiver conveyed by a conveyor or the like, and mount automatically on a conveying pallet by a loading device. A lifting robot of discarded television receiver may be composed freely so as to, for example, suck the CRT surface by vacuum, or hold the both sides of the cabinet (housing) by two arms.

(b) Steps 2 to 4: Tilting device, cleaning device, tilting device

At step 2, of two tiltable work benches, a conveying pallet mounting a television receiver is delivered into the work bench of the side in which the conveying pallet has not been delivered yet. The worker removes the back cover of the housing positioned at the rear side of the housing (cabinet) for composing the television receiver.

At step 3, dust collected in the discarded television receiver is automatically removed by air blow.

At step 4, again, the television receiver is mounted together with the conveying pallet on the tiltable work bench, and the deflecting yoke (DY), chassis and others are removed manually. The members after removing the back cover, DY and others are mounted on the conveyor, and automatically discharged as specified.

Figure 4:
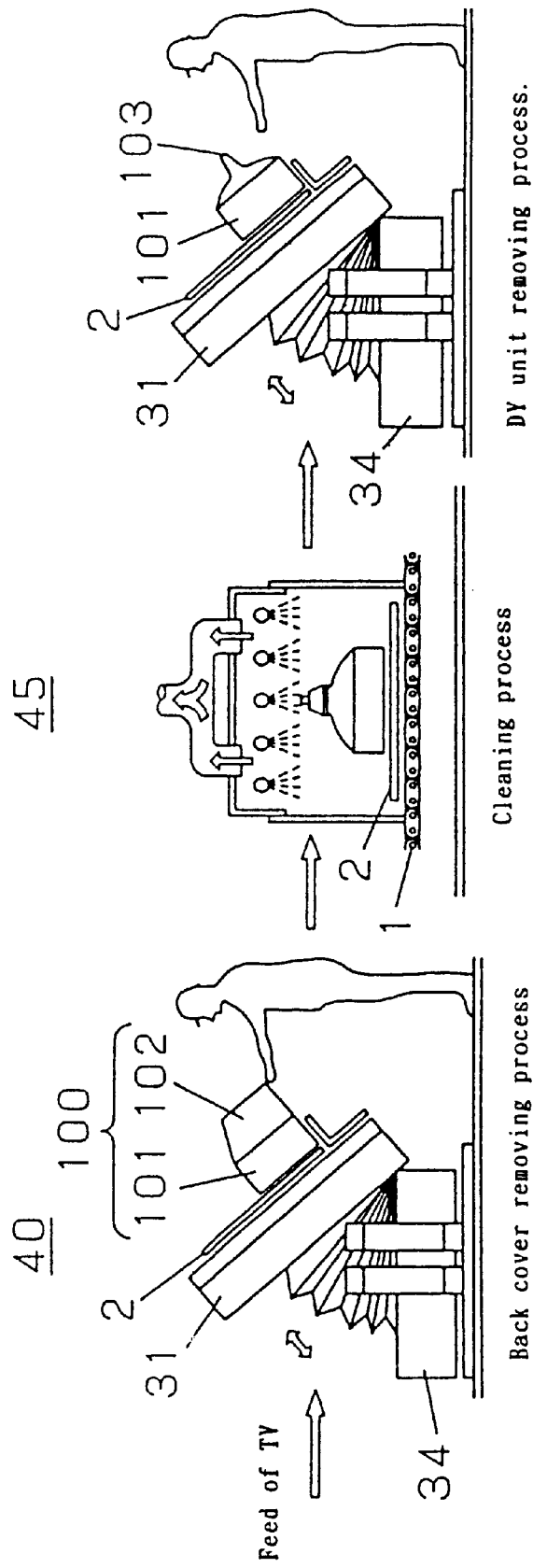
FIG. 4 is a conceptual diagram of a disassembling apparatus of an electronic appliance in an embodiment of the invention.
Figure 5:
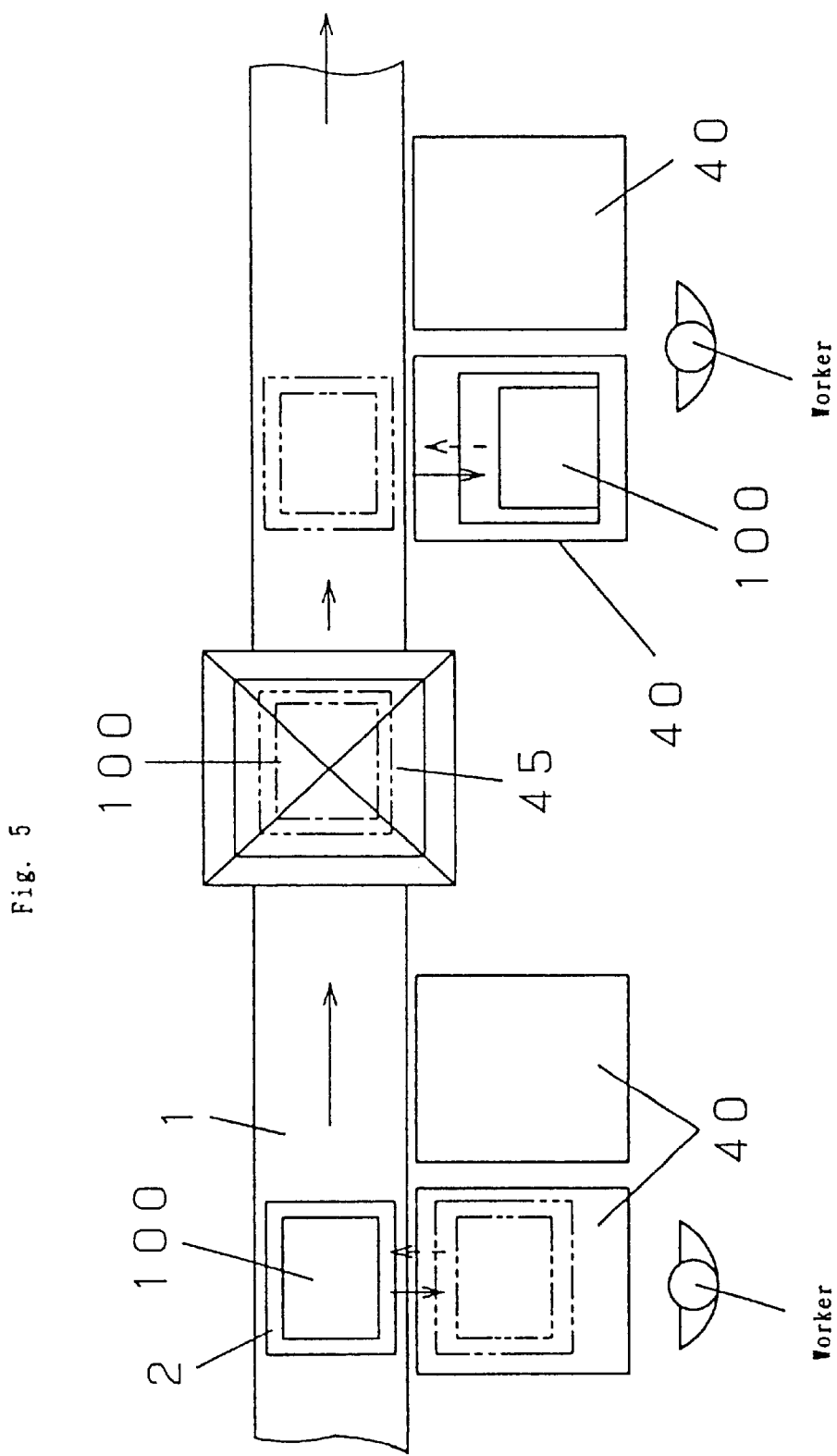
FIG. 5 is an essential plan view of a disassembling apparatus of an electronic appliance in an embodiment of the invention.
Figure 6:
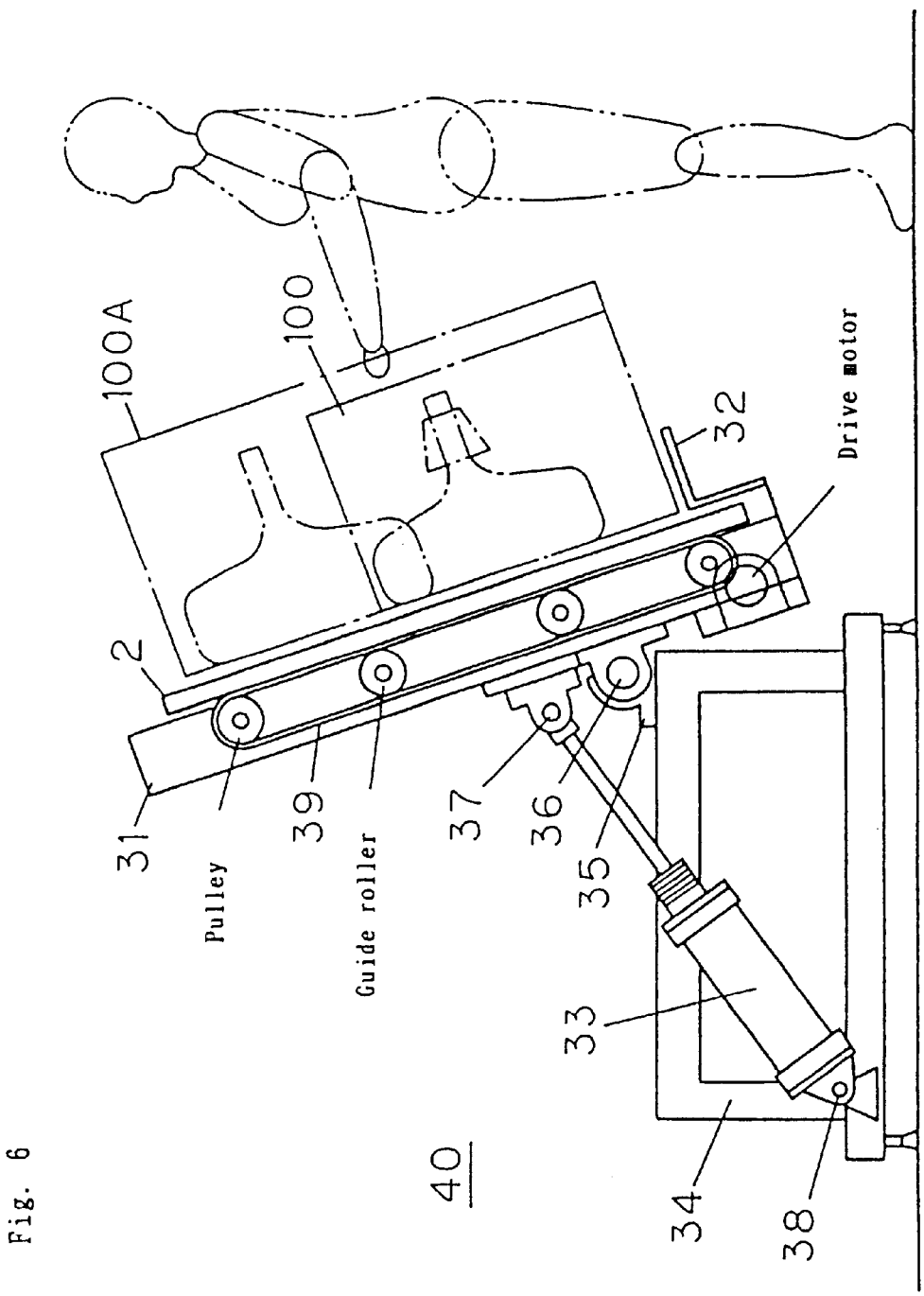
FIG. 6 is an essential side view of FIG. 5.
Figure 7:
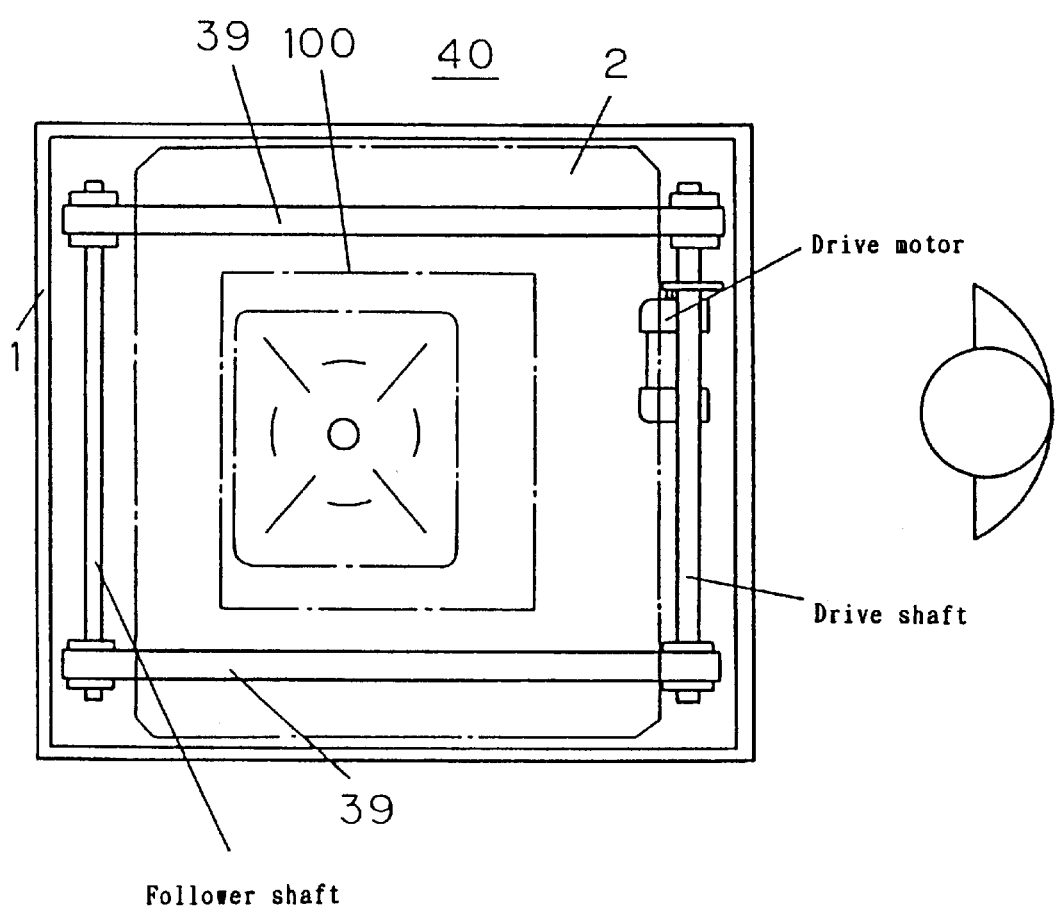
FIG. 7 is an essential plan view of FIG. 6.
Figure 8:
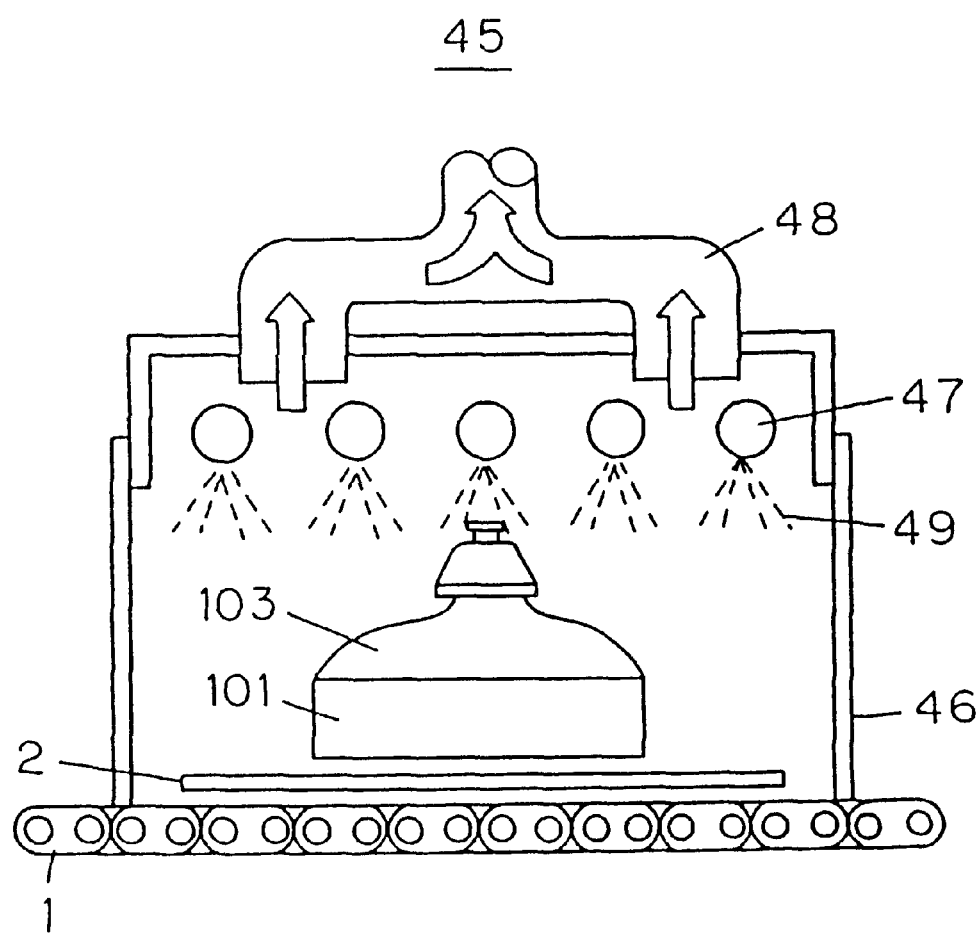
FIG. 8 is an essential side view of a cleaning device in an embodiment of the invention.

Referring next to FIG. 4 through FIG. 8, an embodiment of tilting device and cleaning device is described below. FIG. 4 is a side view of concept of tiltable work bench and cleaning device composed in the embodiment. FIG. 5 is an essential plan view of FIG. 4. FIG. 6 is an essential side view of the tiltable work bench. FIG. 7 is a plan view of FIG. 6. FIG. 8 is an essential side view of the cleaning device.

In FIG. 4 and FIG. 5, a television receiver 100 is mounted on a conveying pallet 2, and is conveyed from the left to right direction in FIG. 5 by means of a conveyor 1. The television receiver 100 comprising a cabinet 101 and a back cover 102 delivered up to before a work bench 40 (left side in FIG. 5) is transferred from the conveyor 1 onto the first tiltable work bench 40 together with the pallet 2, by an automatic transfer device, for example, a belt conveyor (not shown) driven in a direction orthogonal to chain conveyors stretched parallel. The worker is positioned before the tiltable work bench 40.

After the worker confirms that the television receiver 100 has been transferred, a start signal is sent by pressing, for example, a foot switch (not shown), so that the work bench 40 is tilted to a specified angle, for example, in a range of about 45 degrees to 75 degrees. By tilting of the work bench 40, the television receiver 100 mounted nearly in the center of the work bench slides on the conveying pallet, and hits against a stopper 32, and is positioned in a range accessible by the worker. Then the worker removes the back cover 102. After the work, the work bench is put back in horizontal state, and the conveying pallet 2 mounting the television receiver is returned onto the conveying 1 by the automatic transfer device. The returned television receiver is delivered into a cleaning device 45 of next step by the conveyor 2.

In the case of a small-sized television receiver of about 14 inches to 20 inches, meanwhile, it is possible to work in horizontal state without tilting the work bench 40. In the case of a large-sized television receiver, it is designed so that the tilting angle may be set freely by the worker depending on the model or outline shape.

In FIG. 5, the work bench 40 is installed before and after the two cleaning devices 45 each. A first reason is to have a margin in the disassembling processing capacity of television receiver. That is, by this constitution, the working personnel can be increased depending on the processing amount. A second reason is to receive the conveyed television receiver on other work bench if next television receiver to be disassembled is conveyed while disassembling work is done on one of the two adjacent work benches. That is, the disassembling time varies with the size and type of the television receiver. Therefore, if a longer time than a specific processing time is taken, other working bench of two working benches functions as a spare one. In this case, as a matter of course, the worker moves to the adjacent work bench and handles.

The structure of the tiltable work bench 40 is described specifically by referring to FIG. 6 and FIG. 7. In FIG. 6 and FIG. 7, the work bench 40 is composed of a base frame 31, parallel belt conveyors 39, 39 assembled into the frame 31, a drive cylinder 33 installed in the lower side of the frame 31, and a base frame 34.

The belt conveyor 39 is composed of two parallel belts, and the belt conveyor 39 transfers the conveying pallet 2 nearly to the stopper 32, and stops automatically.

The frame 31 is mounted on the hinge so that the one end side may be rotatable, by means of a bearing 35 and a shaft 36. At the other end side of the frame 31, a rod end member of the cylinder 33 is fitted on hinge through a shaft 37. The other end of the cylinder 33 is fitted to the frame 34 through a shaft 38. Thus is composed a link mechanism for rotating at each fulcrum.

In this constitution, when a fluid pressure such as air or oil pressure is supplied to the cylinder 33, the piston rod of the cylinder moves, and the frame 31 is tilted to a specified angle. The television receiver 100 or a large-sized television receiver 100A is mounted on the pallet 2.

As the mean for tilting the frame 31, other arbitrary constitution may be employed. For example, the plate may be tilted by fitting an eccentric disk on the motor shaft. Or the plate may be tilted by a cam mechanism or the like (neither shown).

The cleaning process is described below. In FIG. 8, the television receiver 100 having cabinet 101 and CRT 103 being mounted on the conveying pallet 2 and conveyed to specified position by the conveyor 1 is isolated from the surrounding almost in airtight state by an enclosed box 46 descending from above. Near the ceiling of the enclosed box 46, a spray nozzle 47 and an exhaust duct 48 are disclosed. In this way, the cleaning device 45 is constituted.

Afterwards, a high pressure air shower 49 is injected toward the television receiver 100 from a plurality of spray nozzles 47 disposed near the ceiling. This high pressure air shower 49 blows off dust deposits from the components including the electron gun neck, DY and funnel of CRT, inside of cabinet, printed wiring board contained in cabinet, wiring, and others. Simultaneously with air injection, the exhaust duct 48 is put in operation, and floating dust is sucked and discharged. The air injection time is set at about 5 seconds to scores of seconds.

After cleaning of the television receiver, the enclosed box is raised, and the television receiver mounted on the conveying pallet 2 is sent to next step by the conveyor 1.

At the next step, again, the television receiver is sent into a tiltable second work bench (the work bench located at the right side of the cleaning device in FIG. 5) together with the conveying pallet. On this second work bench 40, the DY unit (the deflecting yoke, neck printed board, etc.) and chassis furnished to the neck of the CRT are removed. In the DY unit removing step, since the inside of the television receiver is cleaned beforehand, floating dust is decreased substantially, and hence there is no adverse effect on the working environments and equipment.

After dismounting the DY unit and others, the CRT attached to the cabinet is sent forward to next step of cabinet cutting process and CRT dismounting process by the conveyor together with the conveying pallet.

In this way, according to steps 2 to 4 in FIG. 3, dismounting of back cover and DY unit, and dust removal in the cabinet can be done efficiently, and the subsequent disassembling procedure can be automated. Besides, the tiltable work bench can pretreat the television receivers in various inch sizes and shapes efficiently.

(c) Step 5: Bottom plate cutting device

Figure 9:
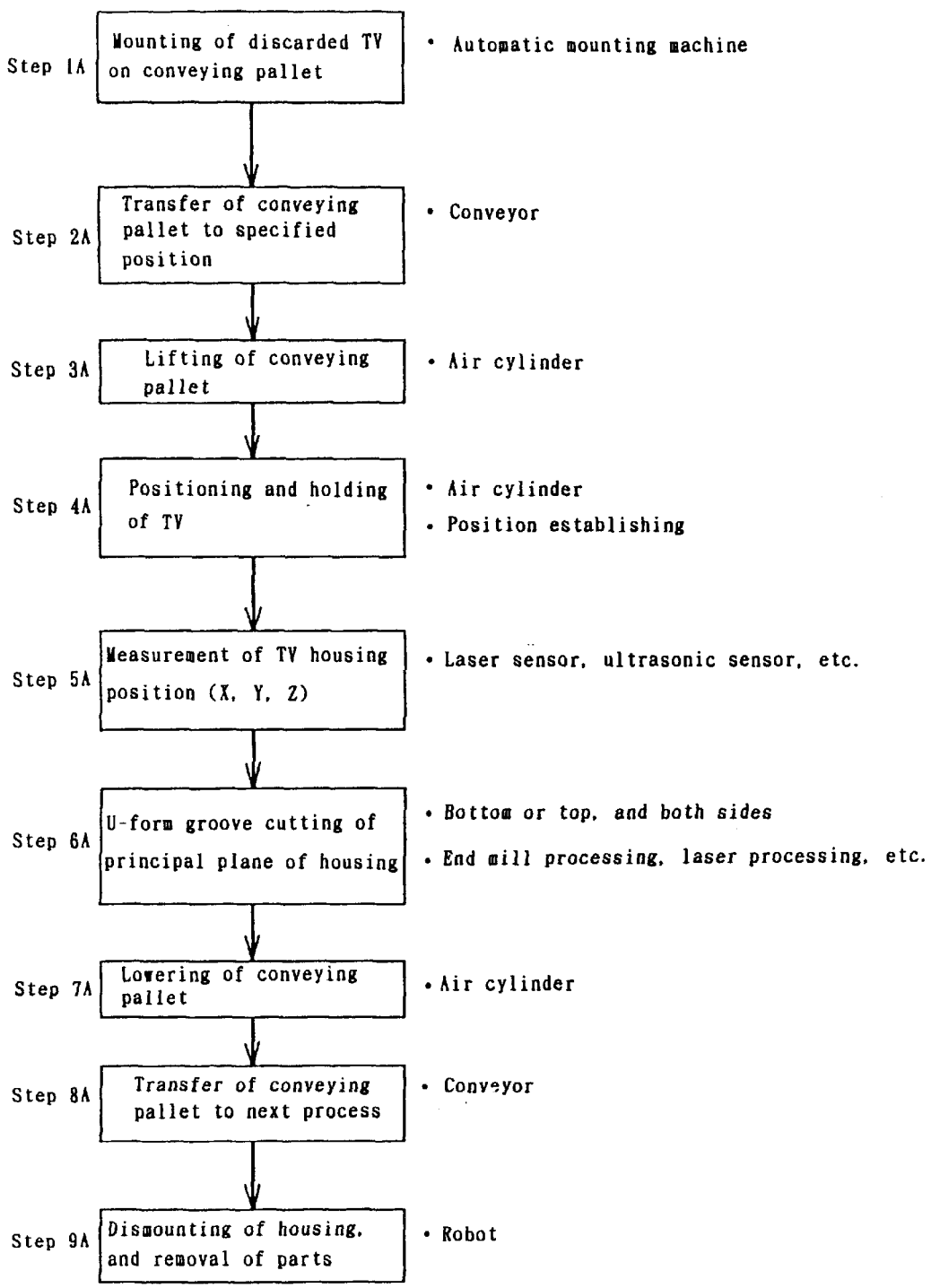
FIG. 9 is a flowchart of disassembling process of television receiver in an embodiment of the invention.
Figure 10:
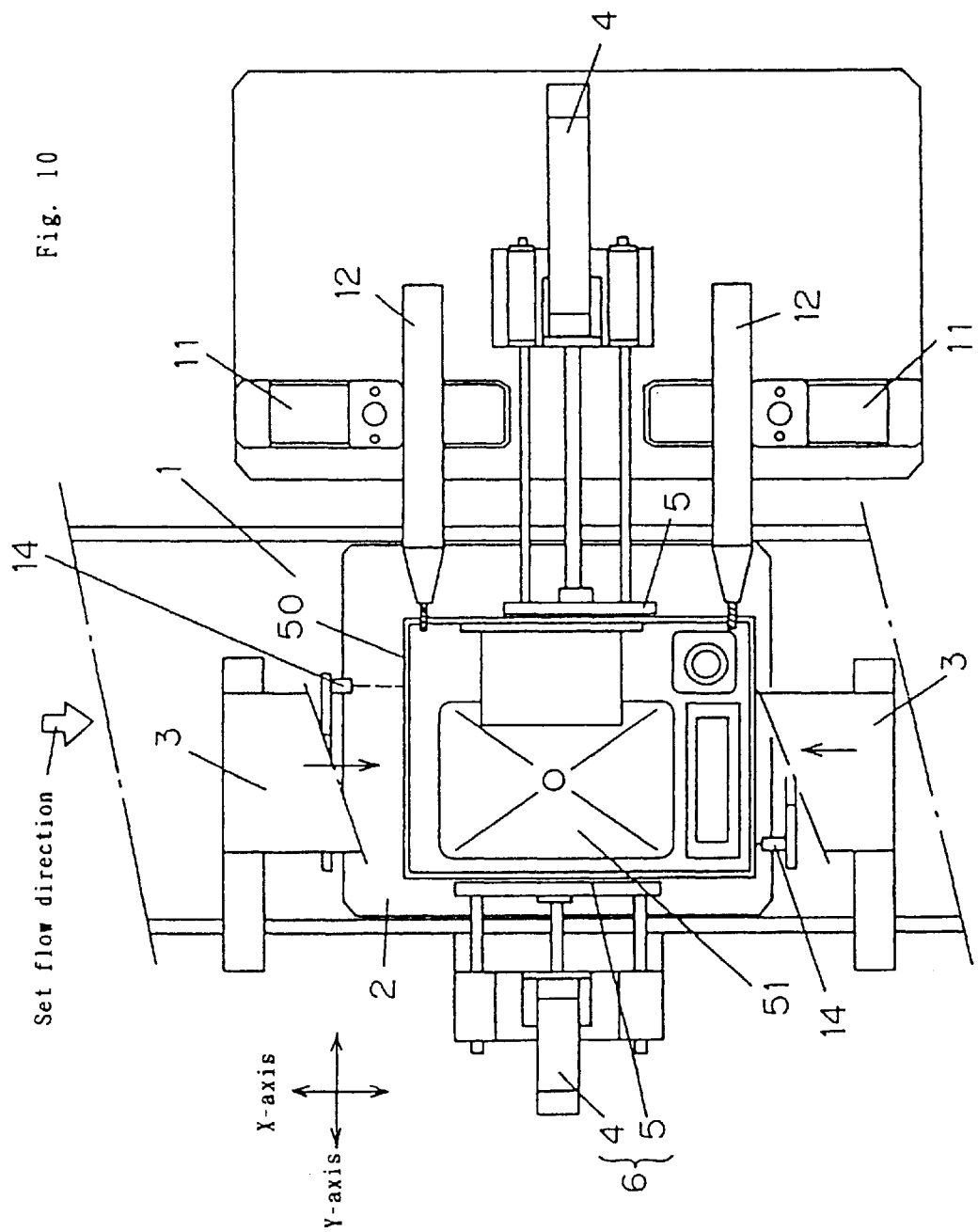
FIG. 10 is an essential plan view of a housing disassembling apparatus in an embodiment of the invention.
Figure 11:
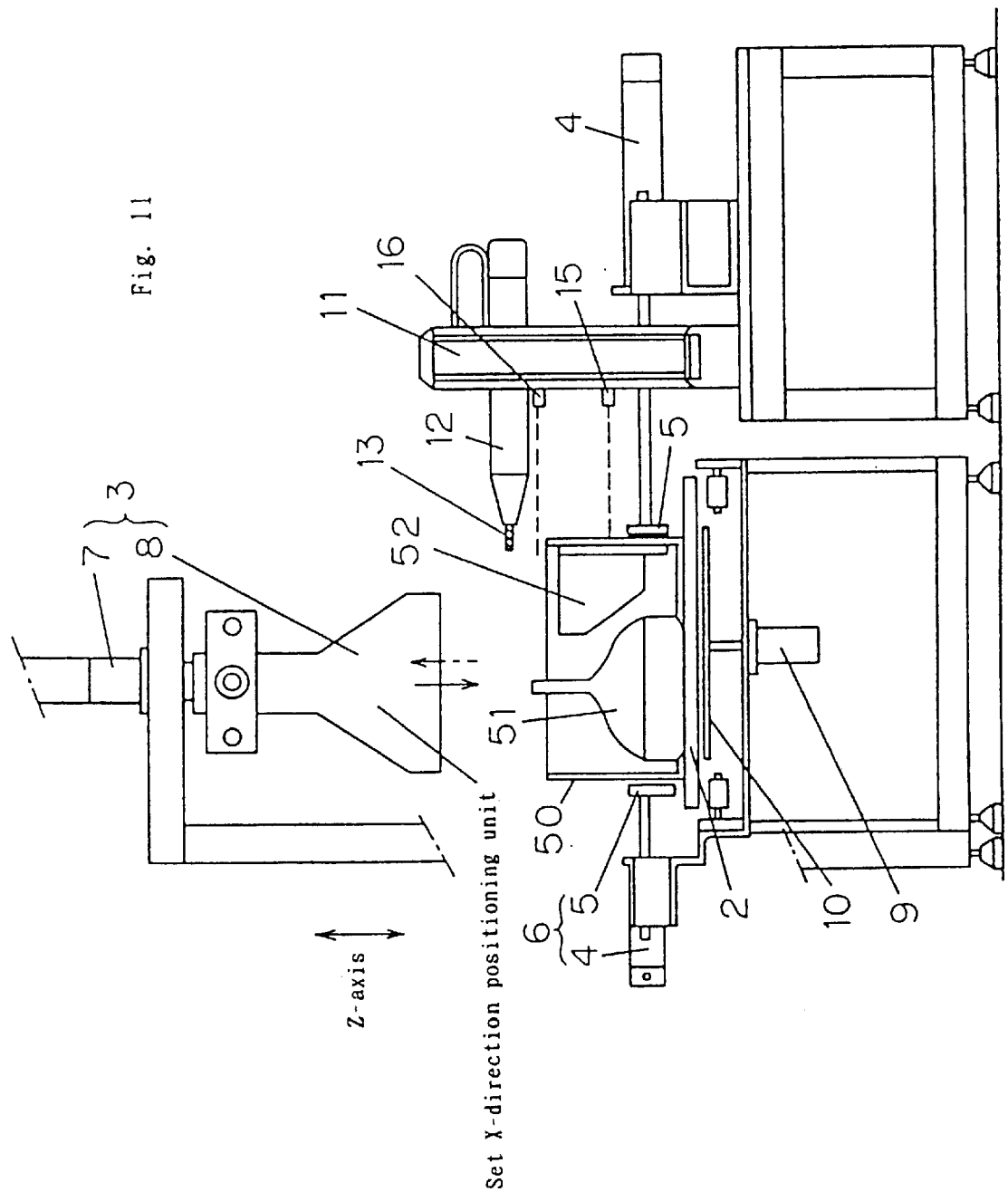
FIG. 11 is an essential side view of FIG. 10.
Figure 12:
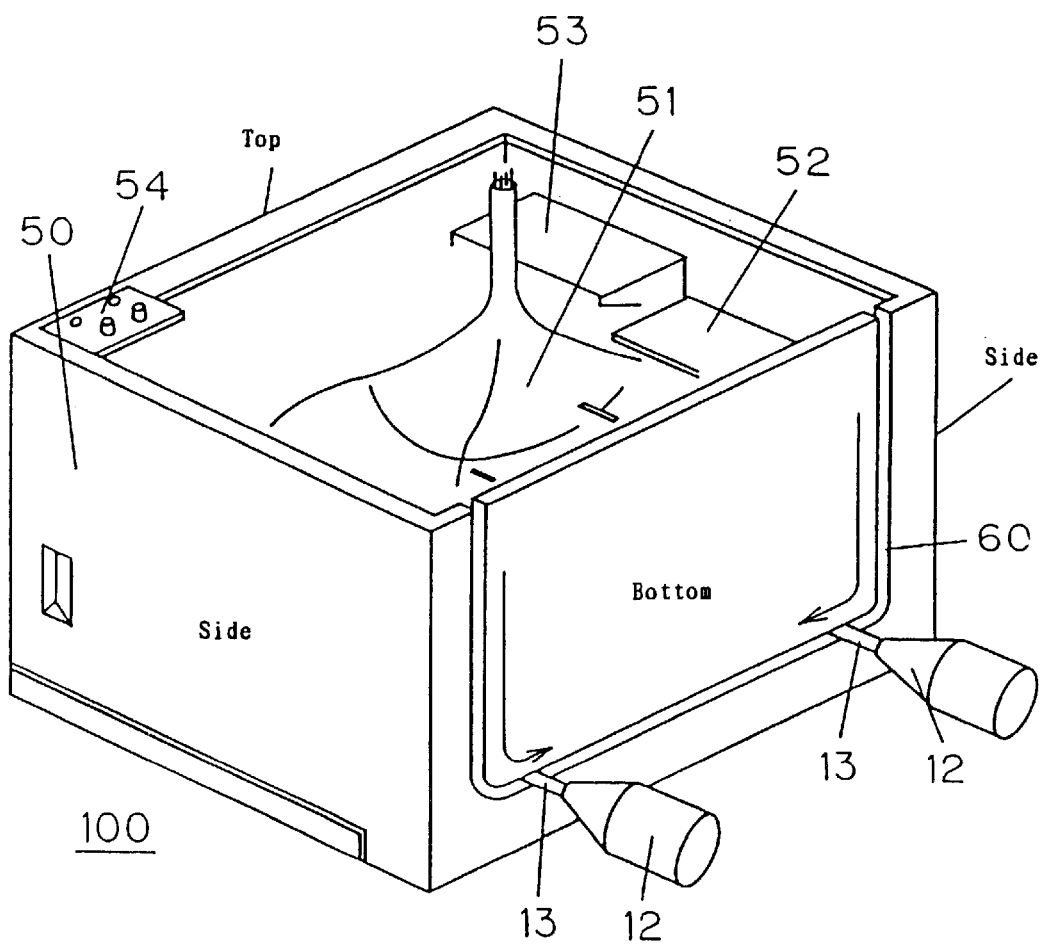
FIG. 12 is a perspective view of cutting groove processing in a housing in an embodiment of the invention.
Figure 13:
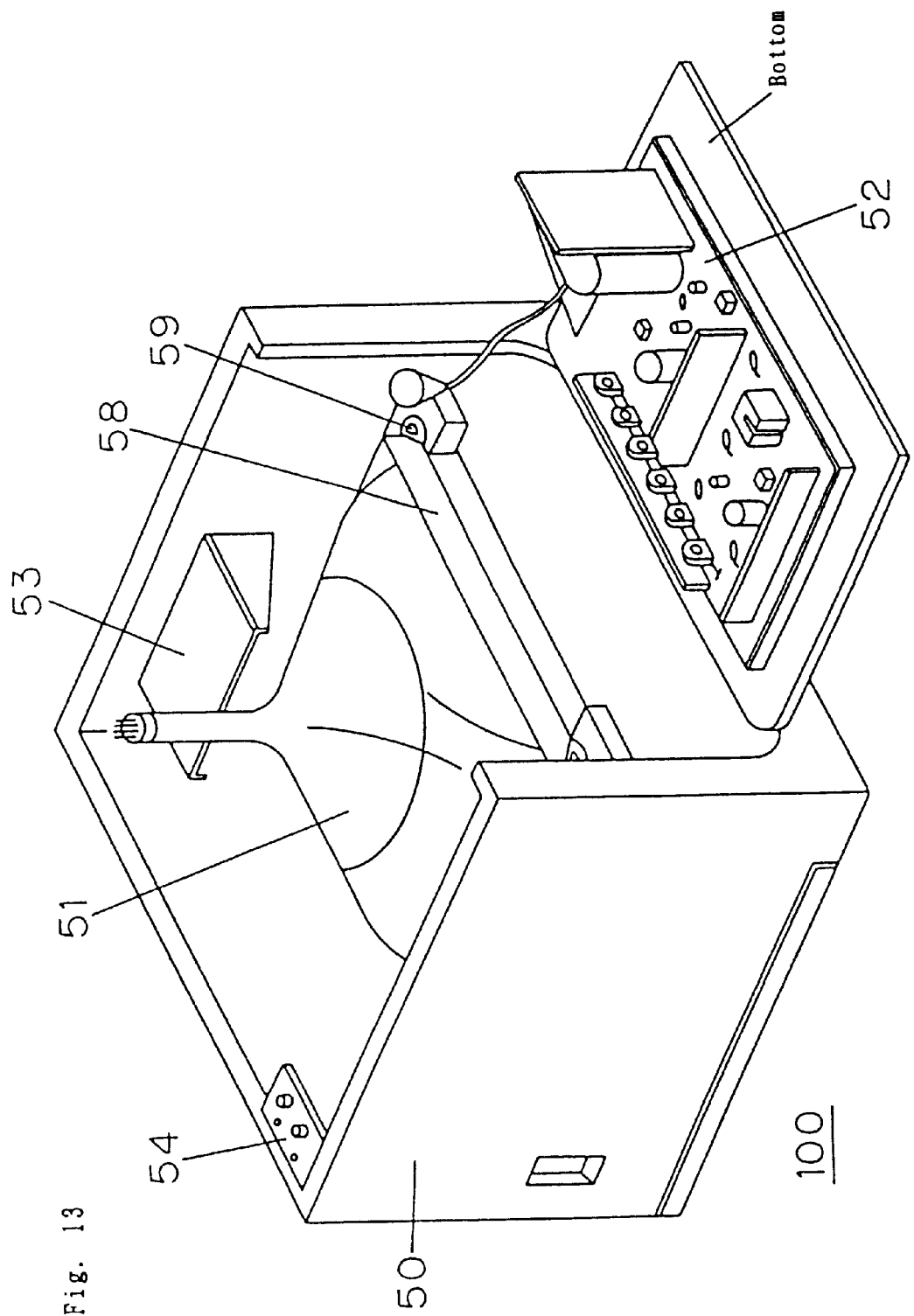
FIG. 13 is a perspective view in an opened state of the bottom after cutting groove processing in an embodiment of the invention.
Figure 14:
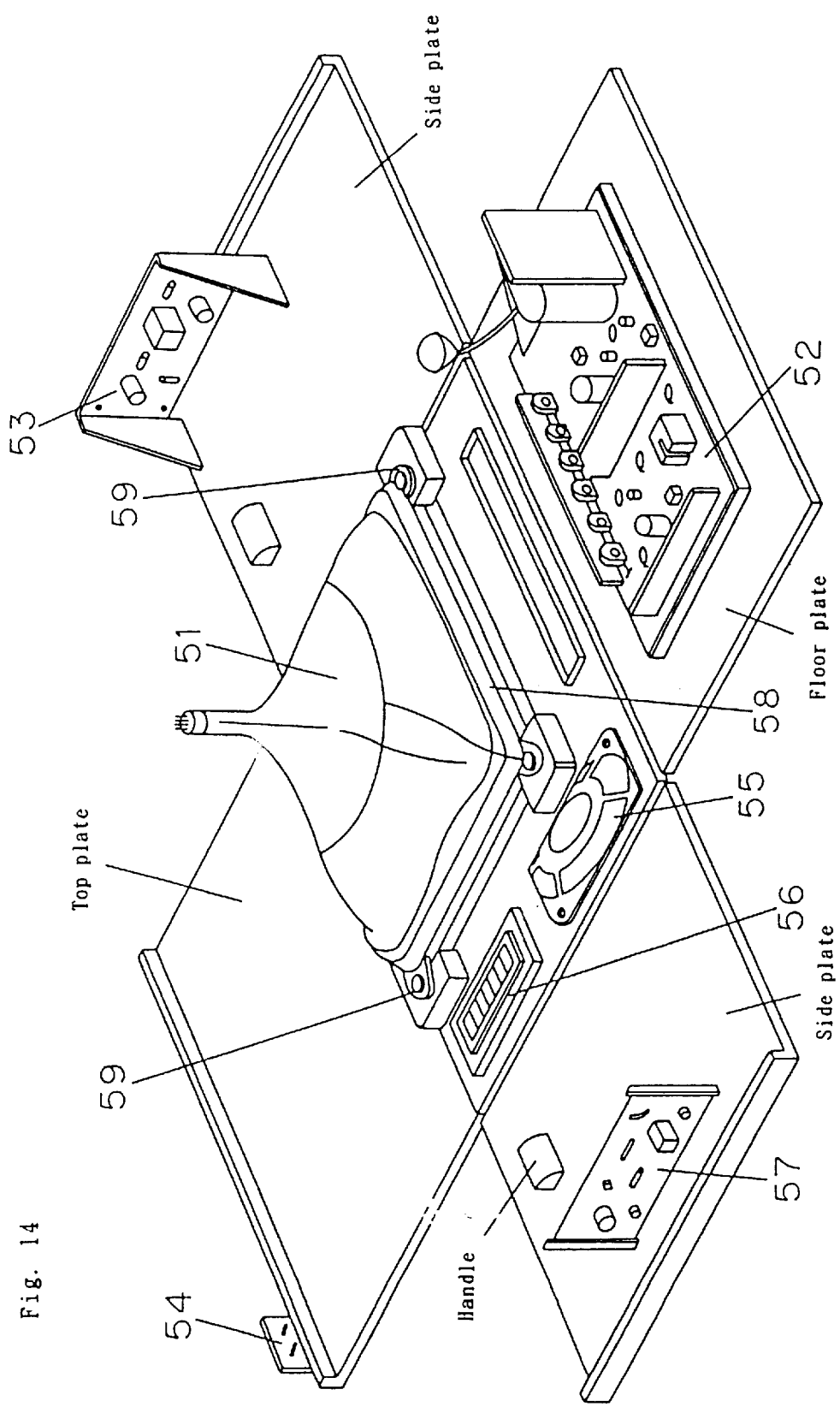
FIG. 14 is a perspective view in a opened disassembly state of four principal side of a housing in an embodiment of the invention.

At step 5, the bottom plate of the wooden cabinet is cut in a U-form, so that the CRT can be drawn out easily. Referring now to FIG. 9 through FIG. 14, an embodiment of a housing bottom plate cutting (housing disassembling) device is explained. FIG. 9 is a flowchart of disassembling process of television receiver in an embodiment of the invention. FIG. 10 is an essential plan view of a housing disassembling device in an embodiment of the invention. FIG. 11 is an essential side view of FIG. 10. FIG. 12 is a perspective view of a process for forming a U-form cutting groove in the principal plane (bottom plane/bottom plate) of the housing for disassembling the housing of a video appliance. FIG. 13 is a perspective view of an opened state of the bottom plane (bottom plate) after finishing the process of the cutting groove. FIG. 14 shows a disassembled state of opening four principal planes of the housing.

The television receiver 100 shown in FIG. 9 through FIG. 13 is composed of a cathode-ray tube 51 (or CRT), a housing (cabinet) 50 connected to the end of the outer circumference of the CRT 51 by screws, a chassis (including control circuit) 52 accommodated in the housing 50, a speaker unit 55 installed near the CRT 51, an antenna terminal board 54, a tuner 56, and printed wiring boards 53, 57 mounted on side plate, among others. In the CRT 51, as shown in FIG. 13, a metal band (reinforcing band for preventing implosion) 58 is wound on the outer circumference (the end of the display screen surface), and mounting tabs 59 are disposed at four positions by spot welding or other means.

The disassembling procedure of the housing of such general television receiver (or TV) is described below. FIG. 9 is a flowchart of "cutting groove processing, disassembling, and constituent member dismounting" of the TV housing. FIG. 10 shows the state of mounting a discarded TV on the conveying pallet 2, and transferring to the specified position, that is, step 2A.

Consequently, by the air cylinder 9, the conveying pallet 2 put on the plate 10 placed at the leading end of the air cylinder 9 is raised above the conveyor 1 (step 3A). Then, the housing 50 of the discarded TV is positioned in the X-axis and Y-axis direction (position establishing: step 4A).

Positioning of the housing 50 in the Y-axis direction is effected by the Y-axis direction positioning means 6 having two confronting air cylinders 4, 4, and plates 5, 5 mounted at the ends of the cylinders 4. The timing is controlled, of course, so that either one of the two air cylinders may advance first to the specified position, so that the other air cylinder may advance later. Positioning in the X-axis direction is similarly effected by X-axis direction positioning means 3. This positioning is executed at a specified timing by means of an air cylinder 7 moving up and down in the Z-axis direction, an air cylinder in the X-axis direction not shown, and a plate 8 fitted to the end of the cylinder 7.

Consequently, the dimensions of the housing established in position in the X-axis, Y-axis and Z-axis direction are measured (step 5A: position measurement of principal planes). Measurement of position of principal planes is a step to be ready for cutting groove process at next step 6A, and a non-contact sensor, such as laser beam sensor, or ultrasonic sensor is used. By operating X-axis direction sensor 14, Y-axis direction sensor 15, and Z-axis direction sensor 16, principal planes (bottom, top, both sides) of the housing 50 are measured and identified. On the basis of the position identification data, a cutting tool 13 such as end mill is driven as specified.

In groove cutting at step 6A, the principal planes of the housing 50 are cut by cutting means (at least one means of, for example, end mill processing of high speed rotation, laser processing, and water jet processing). Rotating and driving means 12 for rotating the cutting tool 13 as specified may be executed arbitrarily by using general 3-axis to 5-axis control robot 11 (for example, scalar robot). The rotating speed of the end mill tool 13 is about hundreds to 25,000 rpm when the tool diameter is 3 mm to 20 mm. Preferably, for the end mill tool of 12 mm in diameter, the rotating speed is about 8,000 rpm to 10,000 rpm. In FIG. 12, a U-form cutting groove 60 is processed in the bottom (bottom plate) of the housing 50 by two each of rotating and driving means 12 and cutting tools (end mills) 13. It is also possible to cut by using only one each of rotating and driving means 12 and cutting tool 13.

A folded open state of bottom of the housing is shown in FIG. 13. Afterwards, by executing sequentially from step 7A (a step for lowering the conveying pallet) to step 8A (a step for transferring the conveying pallet to next process), one cycle of cutting groove process into the housing is terminated.

Later, in other process (other stage), the nuts clamping the mounting tab 59 are detached by robot (not shown) or manually. In succession, the CRT 51, tuner 56, antenna terminal board 54, chassis 52, printed wiring board 53, and speaker unit 55 are dismounted manually or by robot (neither shown). Then it is transferred to the classification and regeneration process of step 9A.

Meanwhile, folding and opening operation of the principal planes of the housing 50 and dismounting operation of constituent members should be preferably done in other process than cutting groove processing, but may be done in the same process as the cutting process. In the flow in FIG. 9, exchange, addition or deletion of steps may be done as desired.

The shape and forming position of the cutting groove are not particularly limited, and it may be formed in any desired shape and position. For example, the groove may be formed while leaving occasional linking portions so that the principal planes may not collapse in the midst of processing, in ridges of four corners in the Z-axis direction (intersection of top and side, and intersection of bottom and side), X-axis direction, and Y-axis direction.

Not limited to the bottom of the housing, a U-form cutting groove may be formed also on the top and both sides. By the housing rotating means not shown, the housing may be rotated by 90 degrees repeatedly (rotation, measurement of position of principal planes, and cutting process).

FIG. 14 shows the disassembled state by opening four principal planes of the housing. Alternatively, by cutting only the ridges of the four corners in the Z-axis direction of the housing, the principal planes may be pushed down and opened by force in other process.

According to the embodiment, when high speed rotating means such as end mill is used as the groove cutting tool, it can be operated in dry process without using water.

Laser processing realizes three-dimensional processing more easily, and curvature processing can be done at high speed. Water jet processing can be applied not only in cutting of housing, but also in glass cutting of CRT.

Thus, according to step 5 in FIG. 3. disassembling work of discarded TV (housing bottom plate cutting) can be automated.

(d) Steps 6 to 7: CRT dismounting device to CRT transfer device

At step 6, the worker removes tightening screws, and dismounts the CRT from the cabinet. Peripheral parts (grounding wire, demagnetization coil, etc.) are also detached. At step 7, the cabinet, removed parts, and CRT are conveyed to next CRT processing step on the conveying pallet.

(e) Step 8: Electron gun cutting

At step 8, a diamond wheel of about 200 mm in outside diameter, and thickness of 2 mm or less is rotated at about 3,000 rpm to 5,000 rpm, and is forwarded straightly in one direction or in a moderate arc, so that the electron gun neck of the CRT is cut off. The separated electron gun is conveyed to the recycling process, while the CRT is sent to the next step.

(f) Step 9: Metal band removing device

At step 9, the metal band for prevention of implosion around the CRT is removed by high frequency heating.

Figure 15:
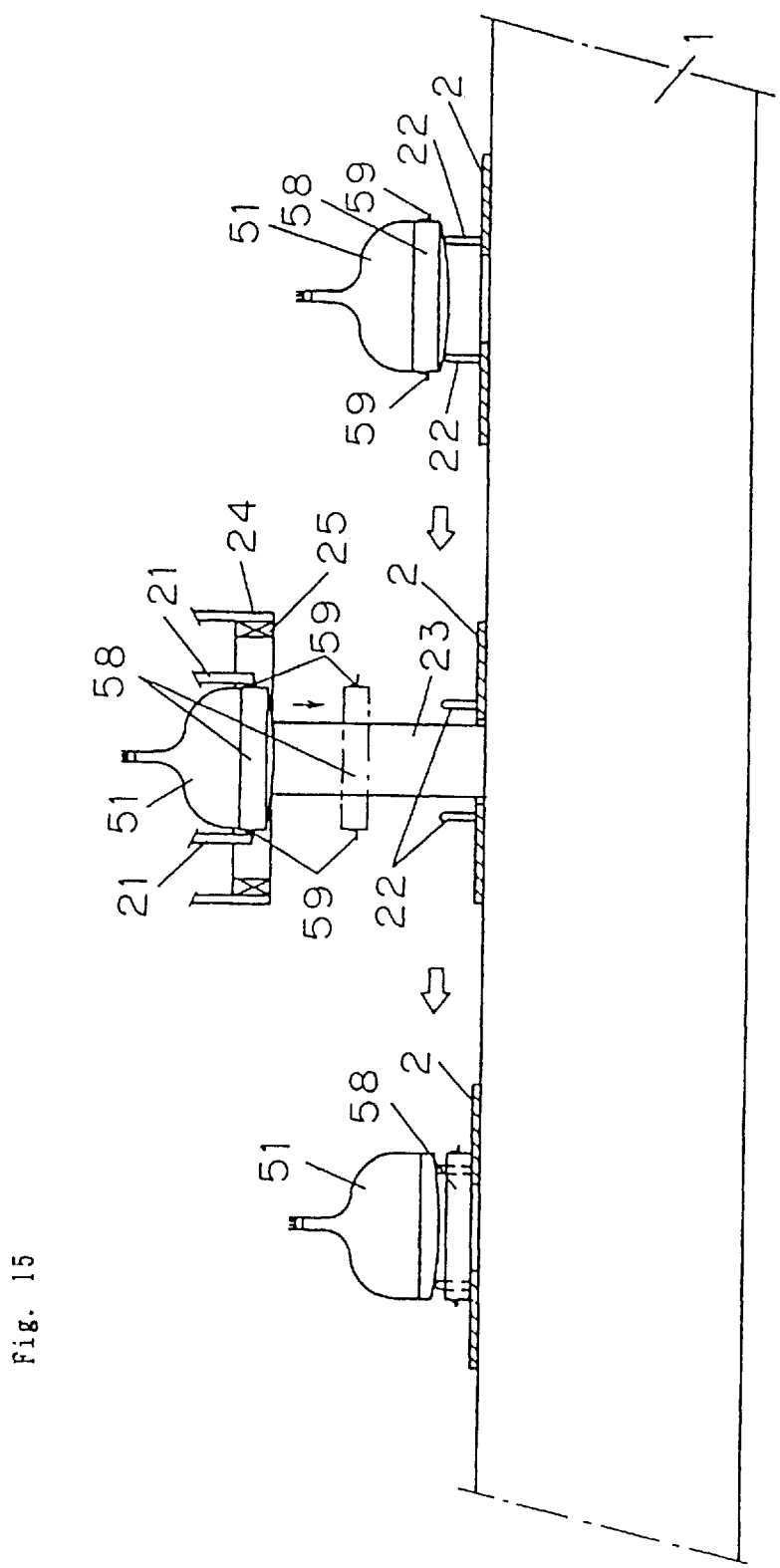
FIG. 15 is a conceptual block diagram of disassembling process of metal band for prevention implosion of a cathode-ray tube in an embodiment of the invention.
Figure 16:
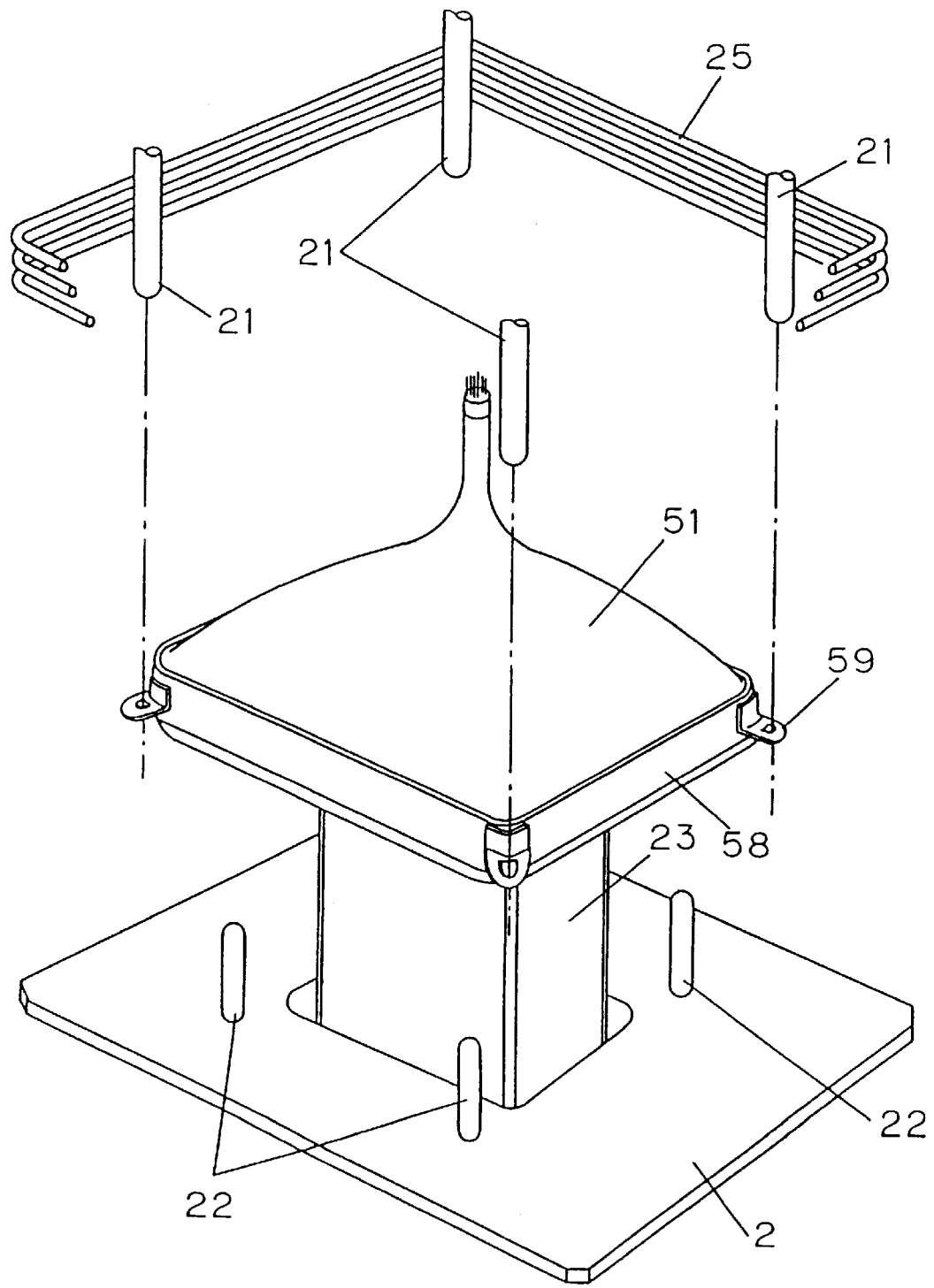
FIG. 16 is an essential perspective view of disassembling apparatus of metal band for prevention of implosion in an embodiment of the invention.
Figure 17:
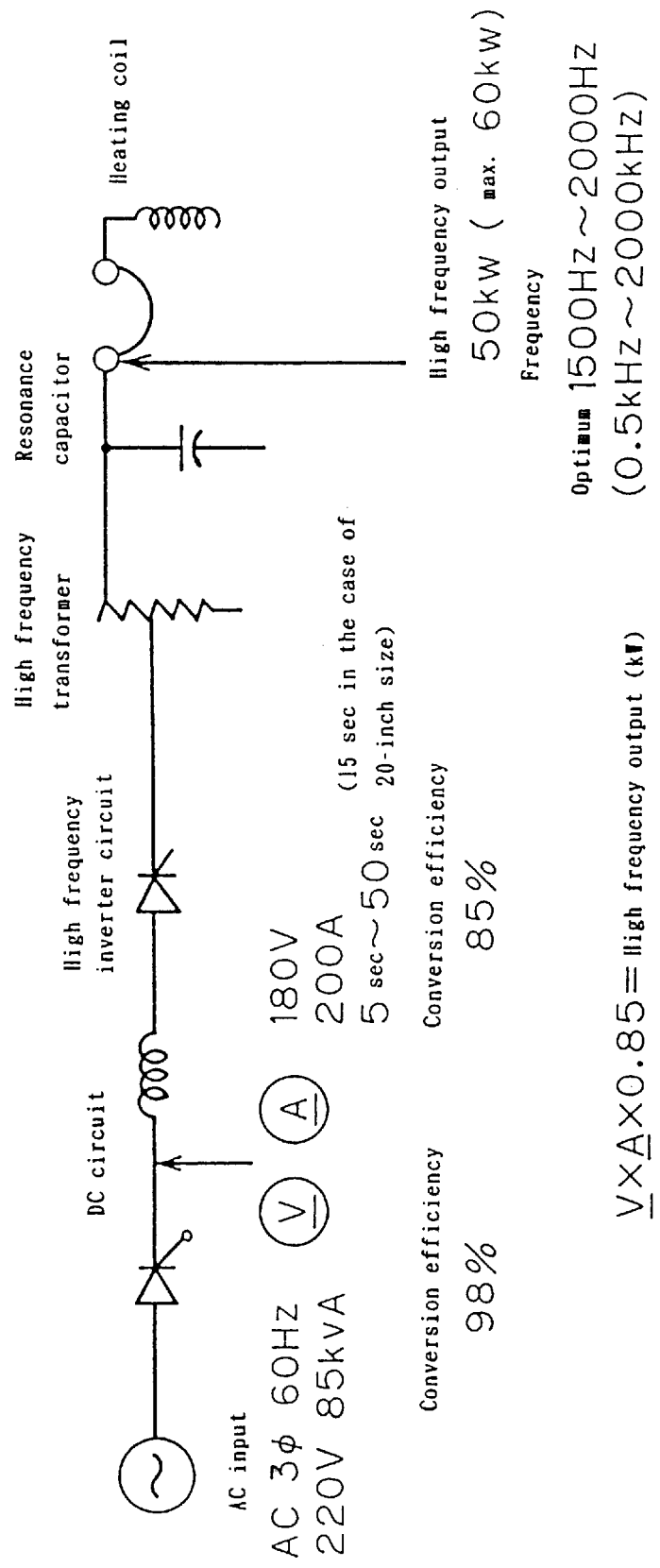
FIG. 17 is a circuit diagram of an equivalent circuit of high frequency heating means for composing FIG. 16.
Figure 18:
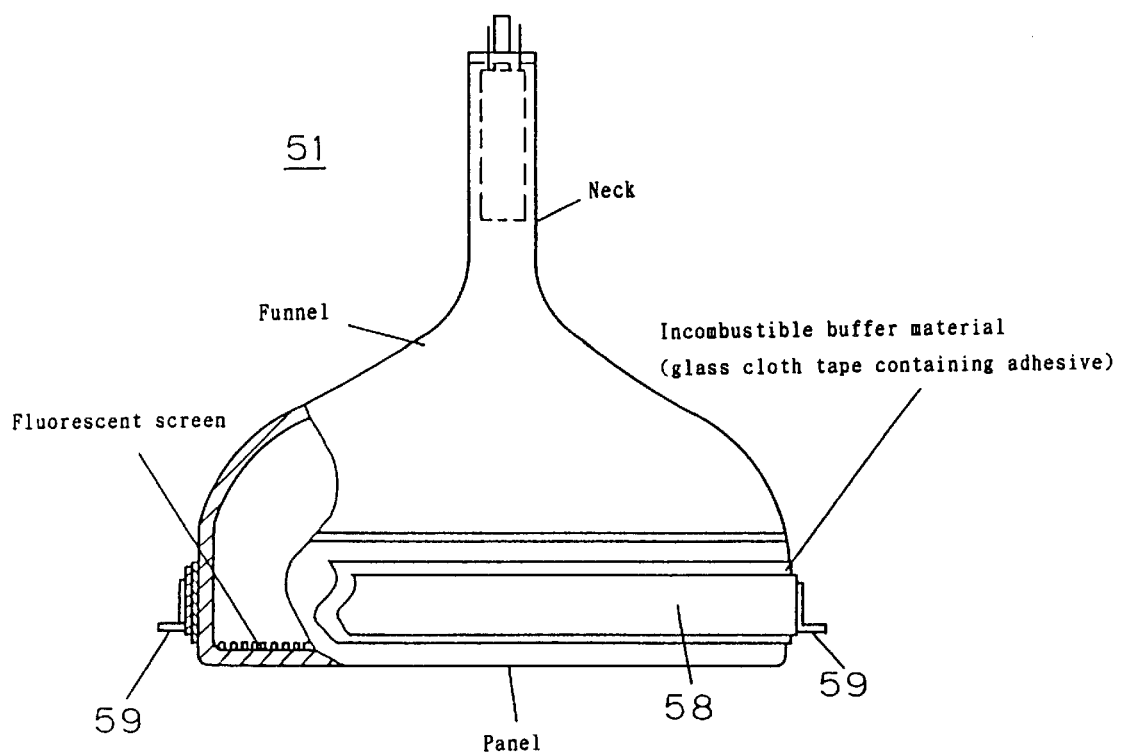
FIG. 18 is an essential side view for an example of cathode-ray tube used in explanation of the invention.
Figure 19:
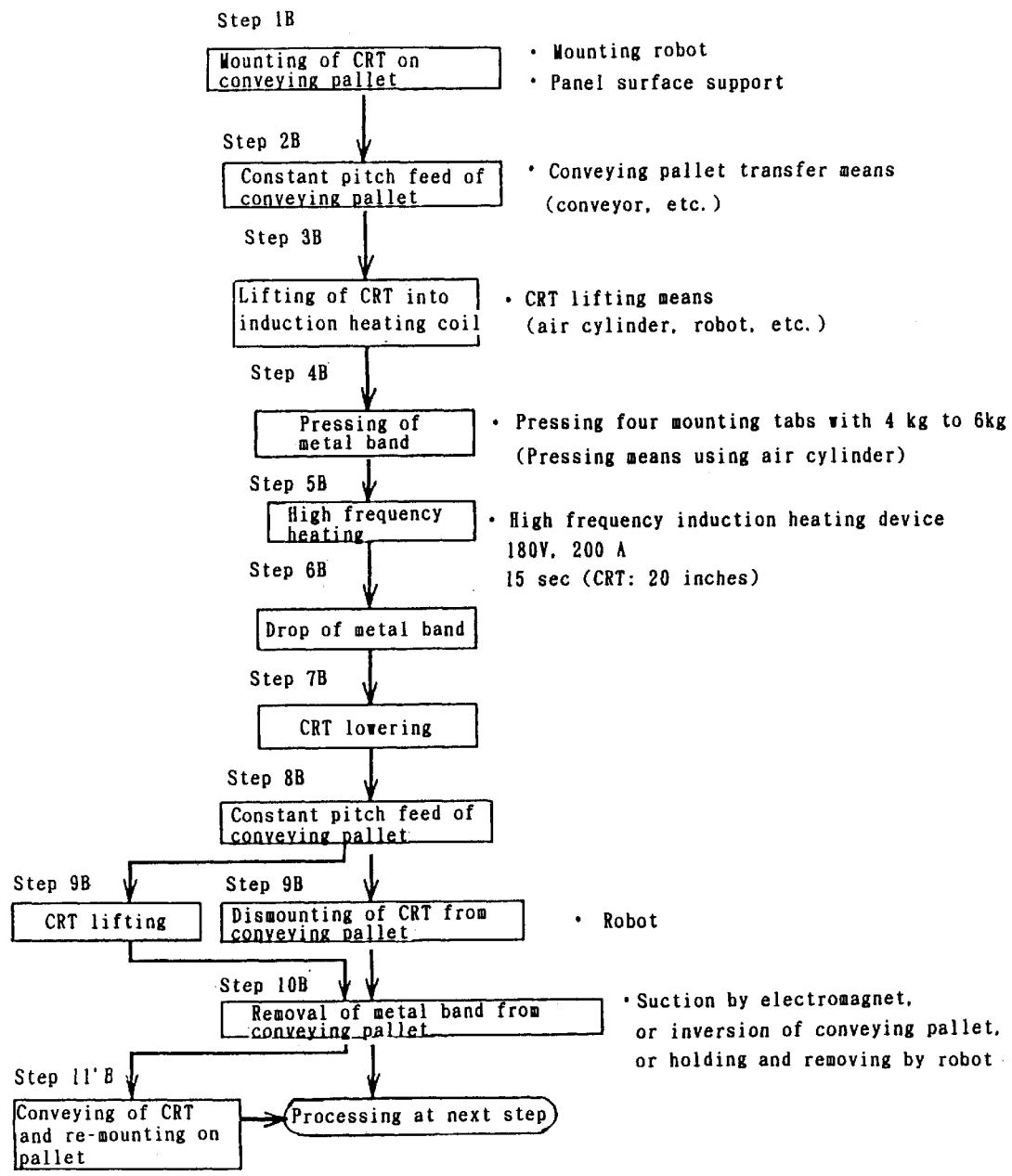
FIG. 19 is a flowchart of disassembling process in an embodiment of the invention.

Referring now to FIG. 15 to FIG. 23, an embodiment of metal band removing device is described below. FIG. 15 is a conceptual block diagram of disassembling process of metal band for prevention implosion of a cathode-ray tube in an embodiment of the invention, showing an essential block diagram of the disassembling apparatus as seen from the side direction. FIG. 16 is an essential perspective view of disassembling apparatus of metal band for prevention of implosion in an embodiment of the invention. FIG. 17 is a circuit diagram of an equivalent circuit of high frequency heating means for composing FIG. 16. FIG. 18 is an essential side view of an example of cathode-ray tube used in explanation of the invention. FIG. 19 is a flowchart of disassembling process in an embodiment of the invention.

A cathode-ray tube 51 shown in FIG. 18 comprises a panel, a funnel, a neck, an implosion preventive metal band 58 wound around the panel, and mounting tabs 59 fitted at four corners of the implosion preventive metal band by spot welding. The internal structure of the cathode-ray tube is not explained herein because it is not the main subject.

In FIG. 15 and FIG. 16, the conveying pallet 2 is put on the conveying means of the conveyor 1, and is transferred by a specific constant pitch. A high frequency heating device (specifically, high frequency induction heating device) 24 is installed at a specified position at the upper side of the conveyor 1. Tab pressing means 21 acts to press the mounting tabs 59 always by a force of 4 kg to 6 kg when heating the implosion preventive metal band 58. An induction heating coil 25 is installed in the high frequency heating device 24 in order to heat the implosion preventive metal band 58 at 350 to 500° C. CRT lifting means 23 is installed for lifting the CRT up to specified position in the induction heating coil 25 through the opening (penetration hole) provided in the center of the conveying pallet 2. CRT supporting means 22 having four pin members is planted and installed at the CRT mounting surface side of the conveying pallet 2.

Disassembling procedure of implosion preventive metal band of a general cathode-ray tube is explained below. A flowchart of an embodiment of disassembling procedure is given in FIG. 19.

In FIG. 15, the cathode-ray tube 51 mounted by supporting the panel surface on the conveying pallet 2 is fed by specified pitch and positioned at the lower part of the high frequency heating device (specifically, high frequency induction heating device) 24. The cathode-ray tube 51 is then lifted to a specified position in the induction heating coil 25 by the CRT lifting means 23. In succession, the tab pressing means 21 descends, and the tab pressing means 21 presses the mounting tabs at four positions with a force of 4 kg to 6 kg each.

Consequently, the high frequency heating device 24 is operated, and the implosion preventive metal band 58 is heated to 350 to 500° C. In this case, as the operating condition of the high frequency heating device, 180 V, 200 A was applied for 5 to 50 seconds at 1500 to 2000 Hz. The application time of the high frequency heating device is about 15 seconds in the case of a 20-inch CRT.

By this heating operation, the implosion preventive heating band 58 is suddenly heated and expanded. As a result, the metal band 58 falls in a reverse state of shrinkage fitting. By heat conduction from the implosion preventive metal band 58, the resin impregnated in the incombustible buffer material or undercoat resin (for example, acrylic resin, polyester resin, or urethane resin) is lowered in the shearing adhesion strength. Finally the adhesion of the resin becomes lower than the pressing force, so that the implosion preventive metal band 58 is separated from the panel. In the center of FIG. 15, a falling implosion preventive metal band 58 is indicated by single dot chain line.

After peeling off the implosion preventive metal band 58, the cathode-ray tube 51 is transferred by a specific pitch. In next process, the implosion preventive metal band 58 is removed from the conveying pallet 2. Thereafter, specified regeneration process is done individually for regeneration of cathode-ray tube glass and regeneration of implosion preventive metal band.

Two examples of removing the implosion preventive metal band 58 from the conveying pallet 2 are shown in FIG. 19. The procedure shown in FIG. 19 is not particularly limited, and steps may be added, deleted, or changed as required.

A circuit diagram of equivalent circuit of the high frequency heating device used in the above explanation and an example of constitution and main specification are given in FIG. 17. The high frequency output of the high frequency heating device used in the embodiment is a maximum of 60 kW at a frequency in a range of 0.5 kHz to 2000 kHz. The output and frequency may be set freely depending in the inch size of the cathode-ray tube. The lower limit output may be about 2 kW.

As the CRT lifting means 23, air cylinder, robot or other arbitrary means may be used. The conveying means of the conveying pallet is not particularly limited, and, for example, roll conveyor, belt conveyor, roller conveyor, chain conveyor, or pusher method using fluid cylinder may be employed.

The tab pressing means 21 is not particularly limited, and, for example, air cylinder, compression coil spring or others may be used. The pressing load may be 4 kg or more each, allowable up to 100 kg as far as the cathode-ray tube is not broken, and preferably it is in a range of 4 to 40 kg.

The front end shape of the tab pressing means 21 is not particularly limited, and an arbitrary shape may be employed. In the tab pressing means shown in FIG. 16, four independent pressing pins corresponding to the tabs 59 are provided.

Figure 22:
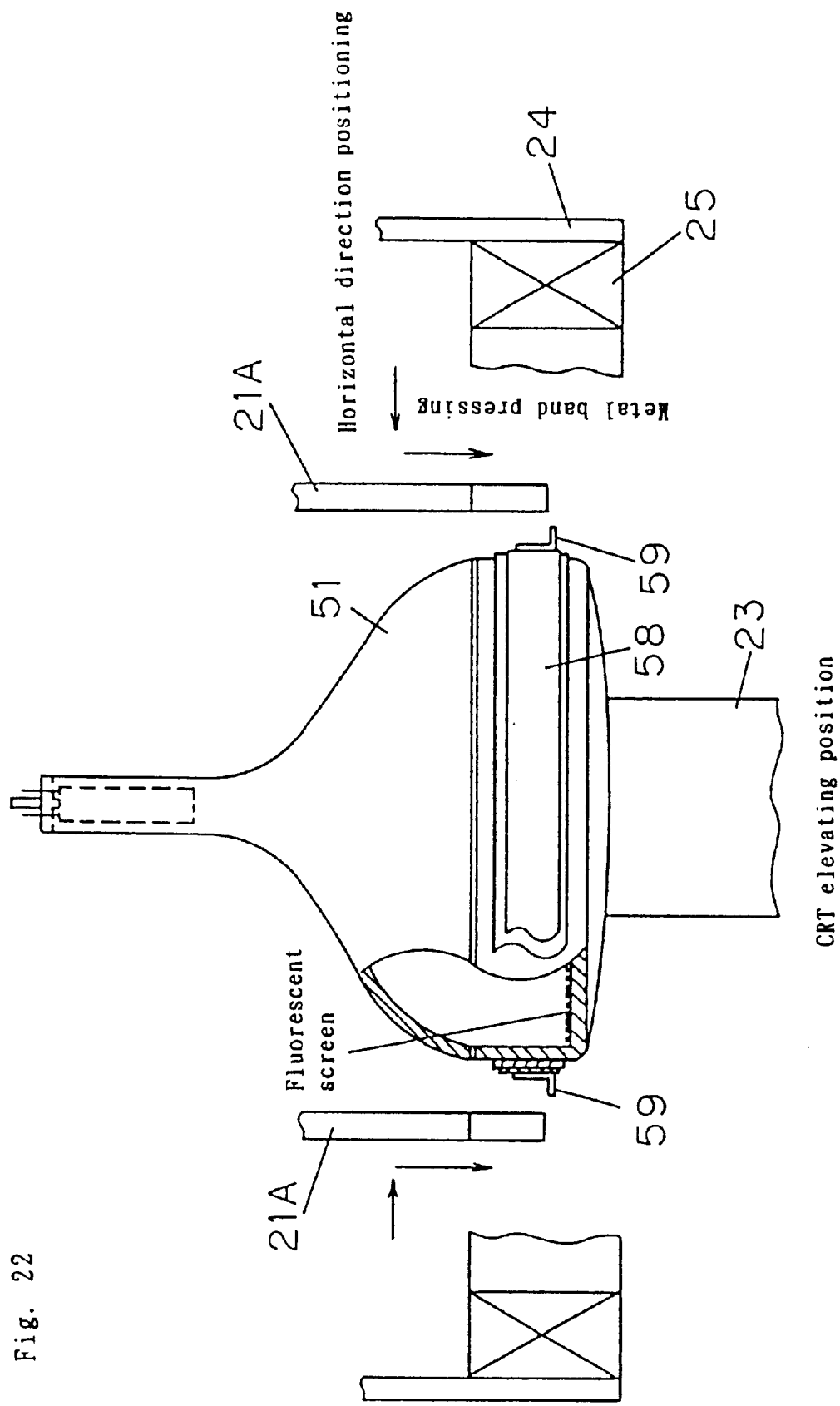
FIG. 22 is an essential side view of disassembling apparatus of metal band for prevention of implosion in an embodiment of the invention.
Figure 23:
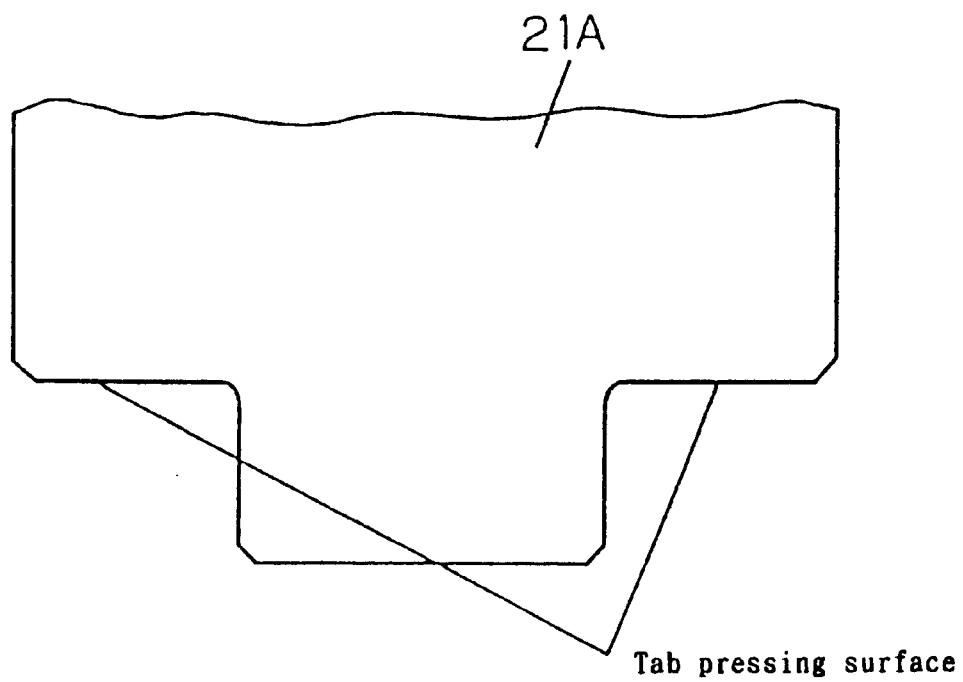
FIG. 23 is an essential front view of tab pressing means for composing FIG. 22.

In the tab pressing means 21A shown in FIG. 22 and FIG. 23, a pair of T-form plates are used. In the tab pressing means 21A composed of T-form plates, as shown in FIG. 23, both side portions corresponding to the tabs are notched in a specified width. The operation of the pair of T-form plates is explained in FIG. 22.

First, the tab pressing means 21A composed of a pair of T-form plates grips the side surface of the metal band 58 of the CRT 51, and positions the CRT 51 at specified position in the horizontal direction. Releasing this gripping force, consequently (the gripping position of the T-form plates remaining unchanged or slightly moved back), the T-form plates 21A descend in the vertical direction to press down the tabs 59. One plate (one side) of the T-form plates 21A presses two tabs 59 each.

Other conveying pallet in an embodiment of the invention is described below. FIG. 20(A) is a plan view of other conveying pallet used in the disassembling device of the implosion preventive metal band of the cathode-ray tube in the invention, and FIG. 20(B) is a sectional view cutting away FIG. 20(A) along S1—S1. FIG. 21(A) is a plan view of another conveying pallet used in the invention, and FIG. 21(B) is a sectional view cutting away FIG. 21(A) along S2—S2.

The conveying pallet 2A in FIG. 20(A) and the conveying pallet 2B in FIG. 21(A) are plate members made of wood, aluminum or other metal, or ABS, duracon or other resin. The outline of the conveying pallet is nearly rectangular. In the conveying pallet of plate form, specified recesses are formed at four positions on the circumference, and penetration holes 27A, 27B are formed in the center.

Moreover, in the conveying pallet 2A shown in FIG. 20(A), on the upper peripheral edge of the penetration hole 27A, an annular recess 29 of one size larger is formed in stairs. A ring-form elastic member 26 is fitted in the annular recess 29. The ring-form elastic member 26 is made of either rubber member or plastic member having a hardness of 35 to 50 degrees, or in a combination thereof.

The rubber material is not particularly limited, and, for example, silicone rubber, fluororubber, butyl rubber, urethane rubber, natural rubber, or other arbitrary member may be used. Of course, a rubber member foamed like sponge may be also used.

The plastic material is not particularly limited, and, for example, silicone system, vinyl chloride system, nylon system, styrol system, and other arbitrary plastic member may be used.

The cathode-ray tube (CRT) to be disassembled is mounted on the center of the conveying pallets 2A, 2B with the tube side down (in FIGS. 20(B), 21(B), the cathode-ray tube is shown by twin dot chain line).

Therefore, the ring-form elastic member 26 is elastically deformed by the own weight of the cathode-ray tube 51, and contacts tightly along the tube surface of the cathode-ray tube 51. As a result, when conveying or stopping the conveying pallet 2A, by the frictional force between the cathode-ray tube 51 and elastic member 28, the cathode-ray tube 51 maintains the initial mounted position without deviation of position.

Figure 21:
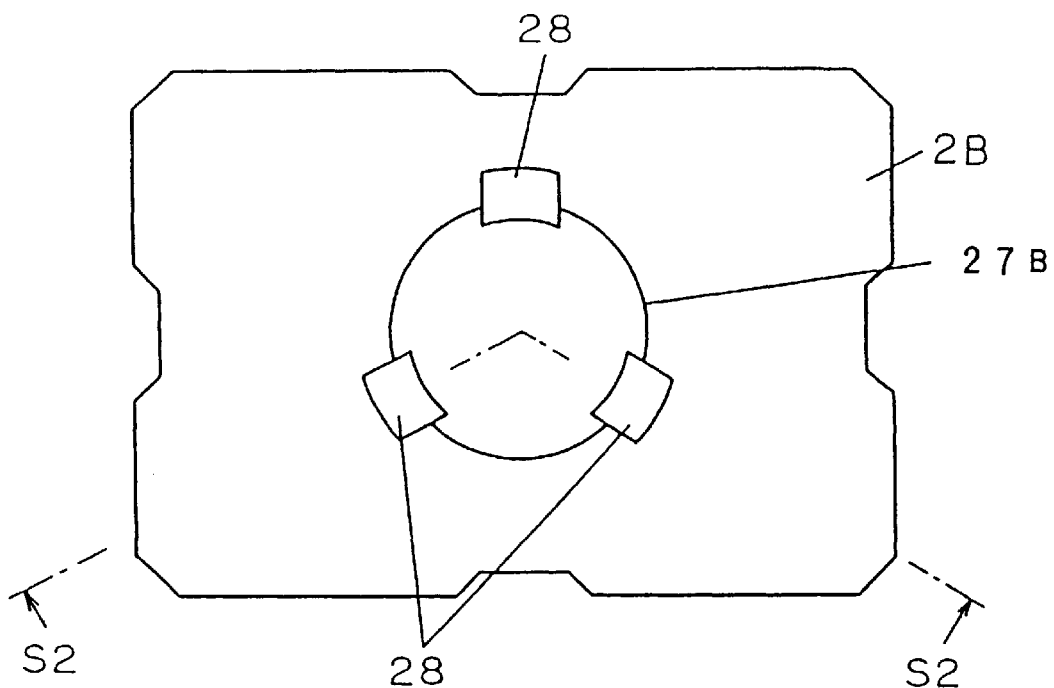
FIG. 21(A) is a plan view of another conveying pallet used in the invention.
FIG. 21(B) is a sectional view cutting away FIG. 21(A) along S2—S2.
Figure 21:
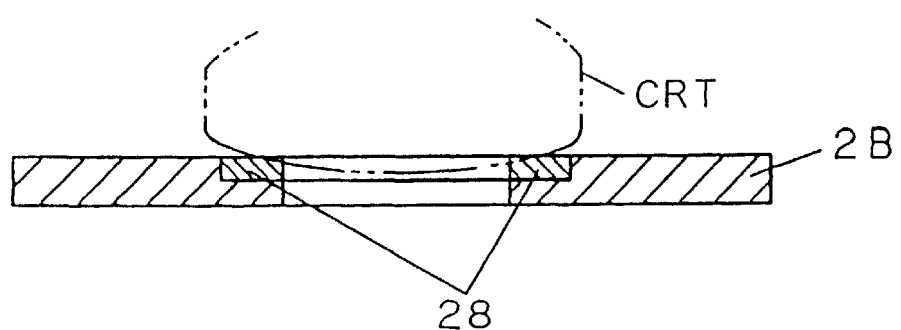

In the conveying pallet 2B shown in FIG. 21, instead of the ring-form elastic member, elastic members pieces 28 are disposed nearly at equal divided angles at three positions on the upper peripheral edge of the penetration hole 27B.

Figure 20:
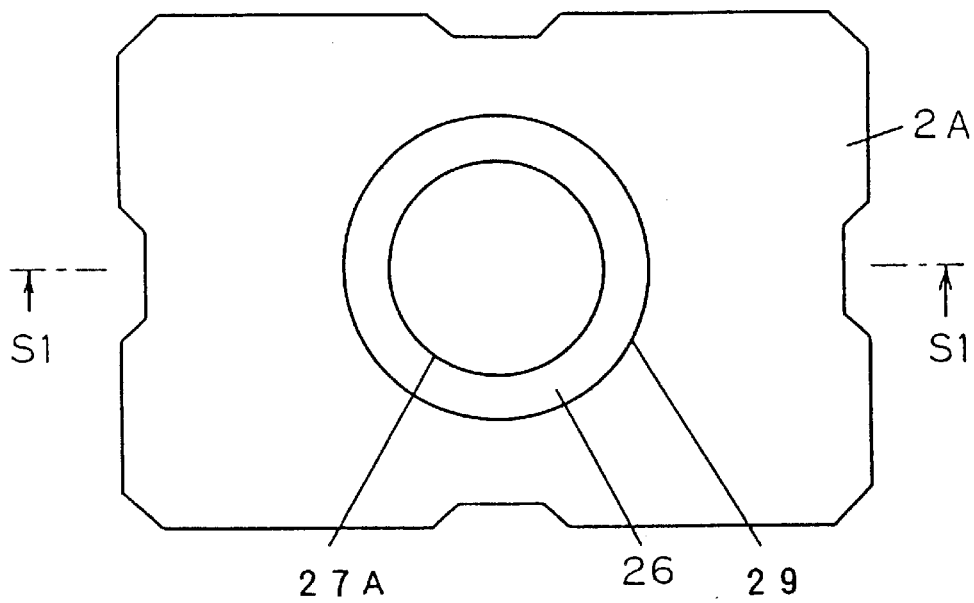
FIG. 20(A) is a plan view of other conveying pallet used in the invention.
FIG. 20(B) is a sectional view cutting away FIG. 20(A) along S1—S1.
Figure 20:
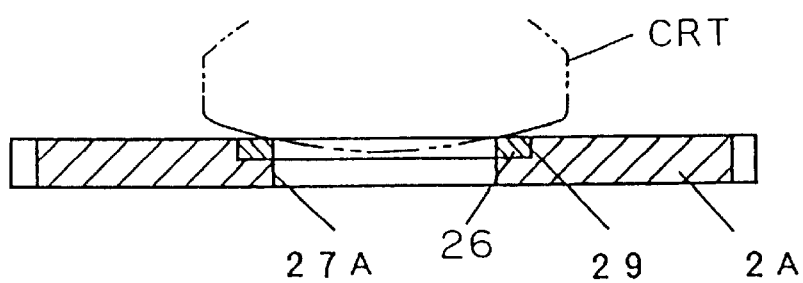

As the constituent member of the elastic member pieces 28, same materials as in FIG. 20 may be used. In FIG. 21, since the cathode-ray tube is supported at three points, positioning of the cathode-ray tube is further stabilized as compared with the case in FIG. 20.

Besides, when conveying or stopping the conveying pallet 2B, by the frictional force between the cathode-ray tube 51 and elastic member pieces 19, the cathode-ray tube 51 maintains the initial mounted position without deviation of position.

The outline of the conveying pallets 2A, 2B is not particularly limited, and any shape may be used. The shape of the penetration holes 27A, 27B is not limited to circle, but rectangular or other shape may be used.

According to the embodiment, the implosion preventive band can be removed efficiently in a short time. Large equipment is not needed. Deviation of position of cathode-ray tube mounted on the conveying pallet can be prevented.

(g) Step 10: CRT double panel measuring device

At step 10. presence or absence of safety glass adhered to the panel surface of the CRT is judged, and the CRT having safety class is classified, and conveyed to next process.

Figure 24:
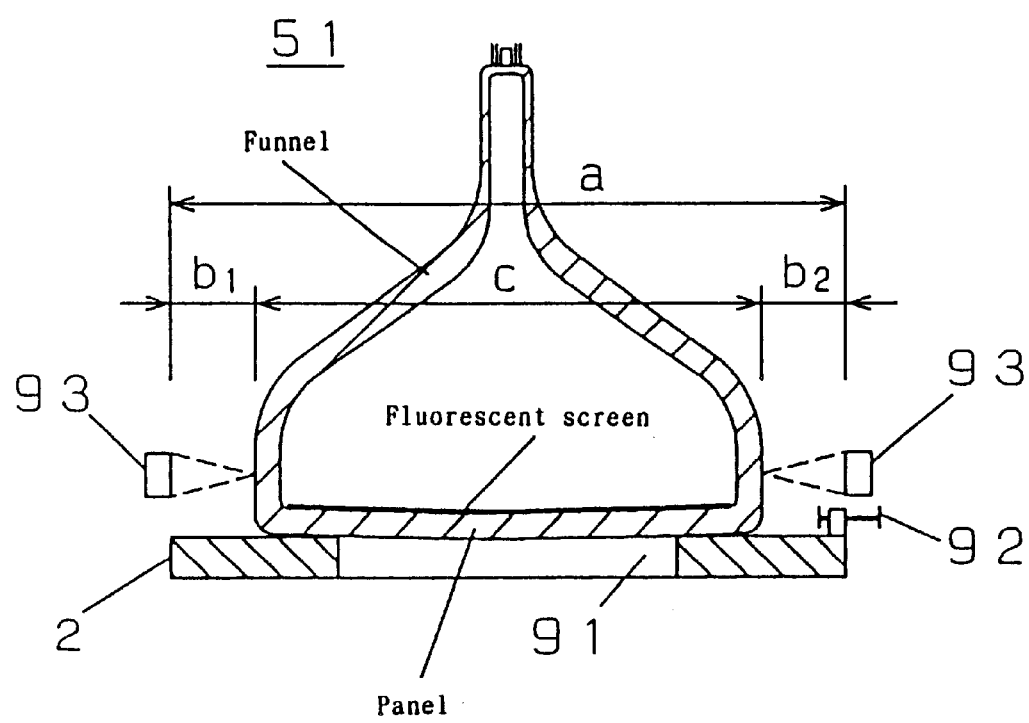
FIG. 24 is an essential sectional view of concept of process for measuring the outline of a cathode-ray tube in an embodiment of the invention.
Figure 25:
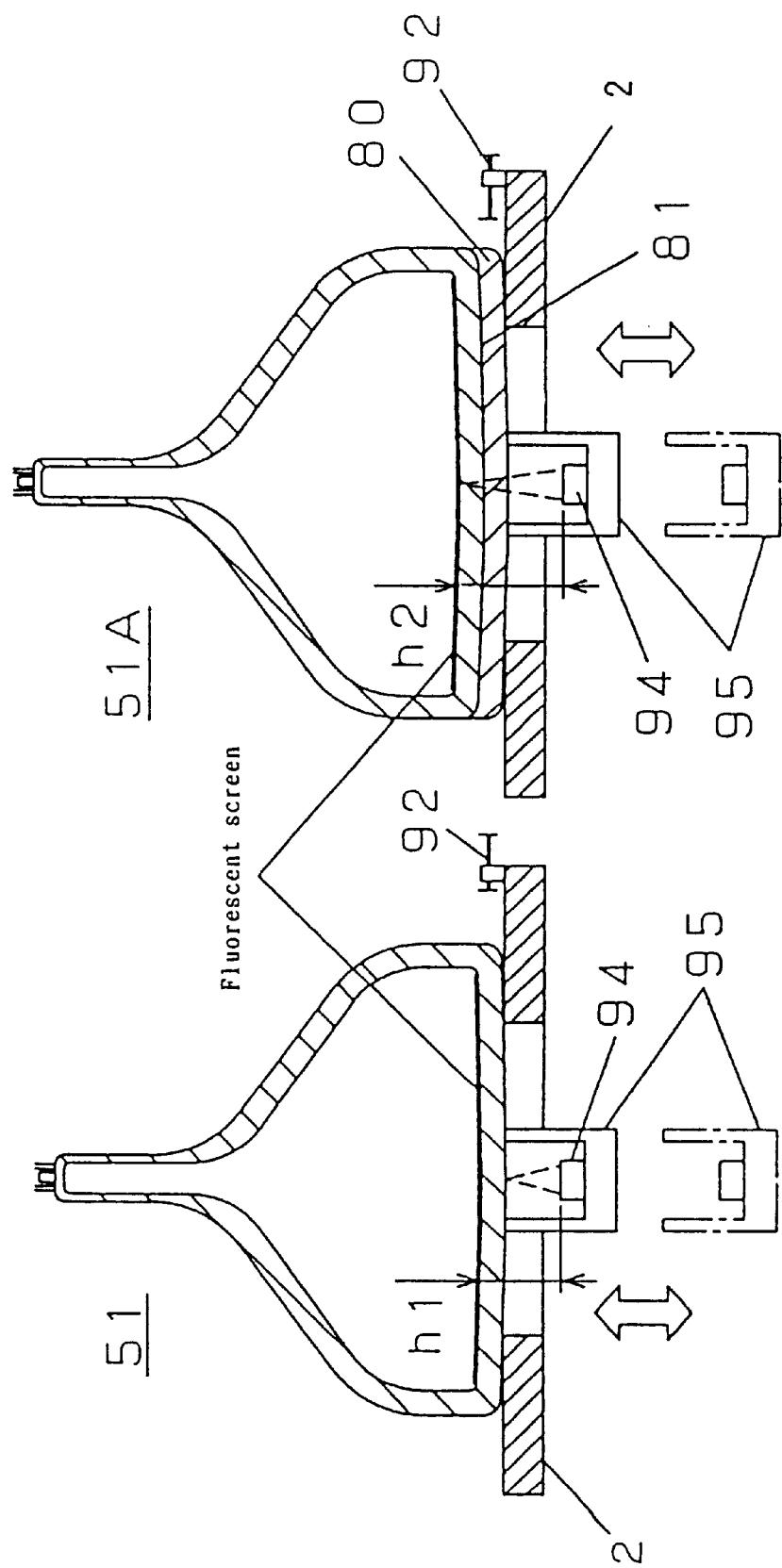
FIG. 25 is an essential sectional view of concept of measuring process from a distance sensor to a fluorescent screen of a cathode-ray tube in an embodiment of the invention.
Figure 26:
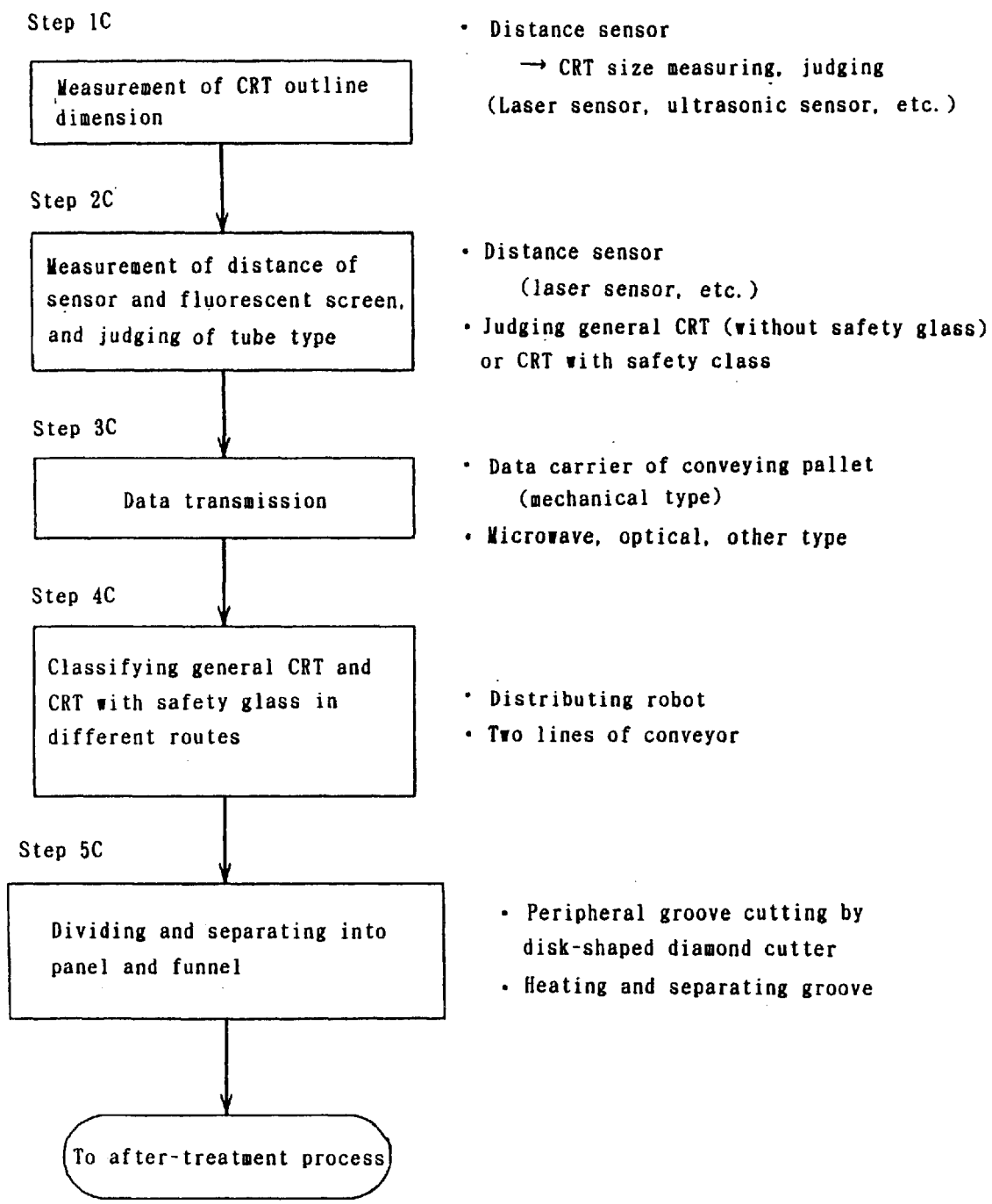
FIG. 26 is a flowchart of measurement to separation process of a cathode-ray tube in an embodiment of the invention.

Referring now to FIGS. 24 through 26, an embodiment of CRT double panel measuring device (CRT judging device) is described below.

FIG. 24 is an essential sectional view of concept of process for measuring the outline of a cathode-ray tube in an embodiment of the invention. FIG. 25 is an essential sectional view of concept of measuring process from a distance sensor to a fluorescent screen of a cathode-ray tube in an embodiment of the invention. FIG. 26 is a flowchart of measurement to separation process of a cathode-ray tube in an embodiment of the invention.

As shown in FIG. 24, after removing the metal band, the cathode-ray tube 51 is mounted on a specified position of the conveying pallet 2 having a penetration hole 91 and data carrier 92 in the center, with the picture display side (tube side) down.

The conveying pallet 2 may be either same as the conveying pallet described in FIG. 20 and FIG. 21, or a different type of different line.

In this state, at least one of the vertical dimension or lateral dimension c of the panel of the cathode-ray tube 51 is measured by a distance sensor 93. By this measurement, the picture display screen size (tube screen size) of the cathode-ray tube is judged. The measured value and judged data are stored in general memory means (not shown). The length dimension c of the cathode-ray tube 51 is measured from the length a between the confronting distance sensors 93, and the lengths b1, b2 from the distance sensors 93 to the panel of the cathode-ray tube 51.

Next, as shown in FIG. 25, a measuring unit 95 comprising the distance sensors 94 is fitted to contact with the picture display screen. Then the distances h1, h2 from the distance sensors 94 to the fluorescent screen of the cathode-ray tube 51 are measured.

In FIG. 25, the left side shows a general cathode-ray tube 51, not having safety glass at the picture display side. The right side shows a cathode-ray tube 51A of special specification having a safety glass 80 disposed through an adhesive agent 81 (for example, unsaturated polyester resin).

The thickness of the safety glass 80 is about 2 mm to 3 mm, the plate thickness of the panel picture display unit is about 10 mm, the thickness of the adhesive agent 81 is about 2 mm, and the interval of the picture display screen and distance sensors 94 is about 20 mm.

Therefore, the measuring distance differs about 5 mm depending on the presence or absence of the safety glass 80. It means that the measuring precision of the distance sensors 94 may be rough, and an inexpensive measuring apparatus can be used. As the distance sensors 94, laser beam, ultrasonic wave, or other arbitrary sensors may be used.

The process from measurement and separation of cathode-ray tube is described further while referring to FIG. 26.

At step 1C, the outline dimension of the cathode-ray tube is measured. That is, the distance a of a pair of confronting laser type distance sensors 93 is set as specified. Next, the distances b1, b2 from the laser type distance sensors 93 to the cathode-ray tube 51 are measured, and the outline dimension c of the cathode-ray tube is determined by the calculation of c=a−(b1+b2).

At step 2C, the distance (measurement) between the distance sensor fluorescent screens and the type of tube are judged. That is, the measuring unit 95 contacts with the picture display screens of the cathode-ray tubes 51, 51A. Next, by the laser type distance sensors 94, the distances h1, h2 from the fluorescent screens applied on the inside of the panel of the cathode-ray tubes 51, 51A are measured.

Measured values of h1, h2 are compared with the distance "H value" from the distance sensors to the fluorescent screens put in the computer preliminarily. In the case of the cathode-ray tube 51 without safety glass 80, the H value is defined in each inch size. Therefore, the H value is set automatically according to the outline dimension information at step 1C.

Then H is nearly equal to h1, the cathode-ray tube placed on the conveying pallet 2 is judged to be an ordinary cathode-ray tube (without safety glass) 51. When H is smaller than h2, and the difference of H and h2 is about 3 mm to 4 mm or more, the cathode-ray tube is judged to be a cathode-ray tube 51A with safety glass.

At step 3C, the measured data and judged result are transmitted and stored in a mechanical data carrier 92 furnished to the conveying pallet 2. In FIG. 25, the data carrier 92 is moved to the left.

As the data memory means 92, meanwhile, aside from the mechanical memory shown in FIG. 25, optical, microwave, or other arbitrary means may be employed.

At step 4C, cathode-ray tubes put on the conveying pallet 2 are classified into general cathode-ray tubes 51 and cathode-ray tubes with safety glass 51A. That is, the data in the data carrier 92 is read, and when the data is judged to be cathode-ray tube with safety glass 51A, this cathode-ray tube 51A is automatically transferred to other line. As a result, adhesive agent 81 such as unsaturated polyester resin is prevented from being mixed into the cullet.

At step 5C, the cathode-ray tubes 51, 51A are separated into the panel and funnel.

In each line of cathode-ray tubes 51 without safety glass and cathode-ray tubes 51A with safety glass, the boundary of the panel and funnel of the cathode-ray tube is cut in a groove of specified depth circularly by a disk-shaped diamond cutter.

The groove is then heated, and the panel and funnel are separated by making use of difference in thermal stress and thermal expansion.

The disk-shaped diamond cutter is 80 mm to 120 mm in diameter, 0.2 mm to 2 mm in disk thickness, and 2,000 rpm to 10,000 rpm in rotating speed, and water is used as coolant. The groove cutting depth is about 0.2 to about 2 mm.

As mentioned above, according to the judging method of cathode-ray tubes of the invention, the picture display size of the cathode-ray tube can be identified and presence or absence of safety glass can be judged automatically, and the cathode-ray tube can be automatically separated into the panel and funnel at high productivity.

In the embodiment, regardless of the manufacture, model, or product number of video appliances, numerous unspecified discarded video appliances can be regenerated. If the product number, model code, symbol, bar code and other codes provided in the housing of the video appliances or cathode-ray tubes can be automatically identified by CCD camera or the like, according to the identified data, judgement of the manufacturer name, model name and size of cathode-ray tube, groove cutting process in housing, judgement of presence or absence of safety glass in cathode-ray tube and classification, and separation into panel and funnel can be executed.

(h) Step 11: Automatic brushing device

At step 11. for the purpose of shock absorbing and adhesion of the implosion preventive metal band 58, the adhesive tape 72 glued to the side of the cathode-ray tube 51 is peeled off, or the adhesive agent of the adhesive tape 72 is scraped off.

In an embodiment of the invention, hereinafter, deposit removing method of cathode-ray tube and its apparatus (automatic brushing device) are described by referring to FIGS. 27 through 32.

Figure 27:
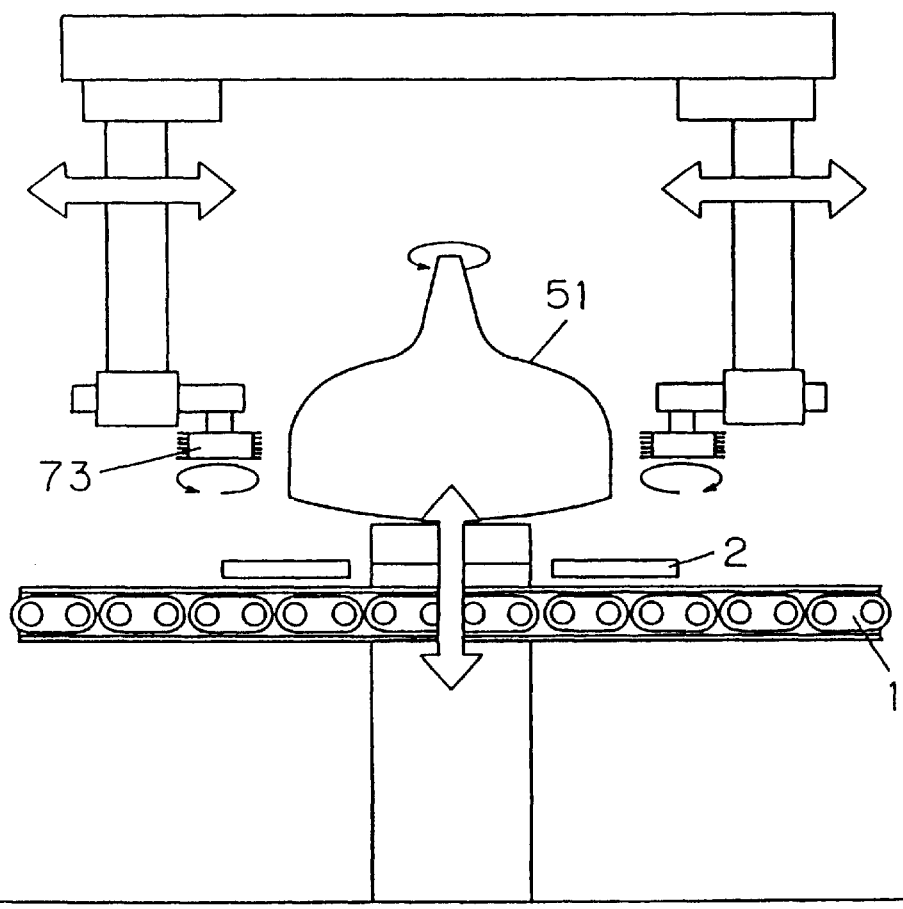
FIG. 27 is a conceptual block diagram of deposit removing device of a cathode-ray tube in an embodiment of the invention.
Figure 28:
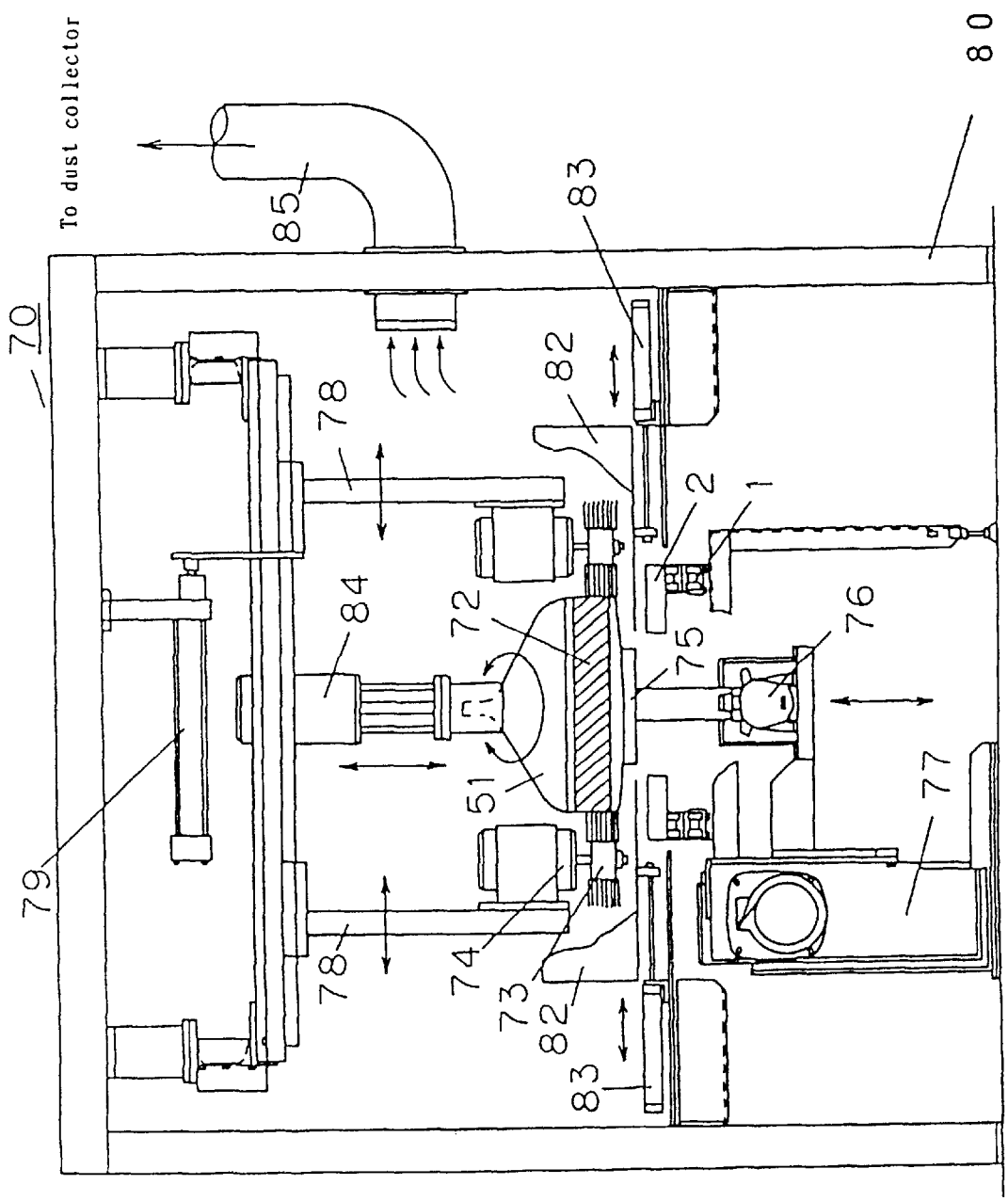
FIG. 28 is an essential side view of deposit removing device of a cathode-ray tube in an embodiment of the invention.
Figure 29:
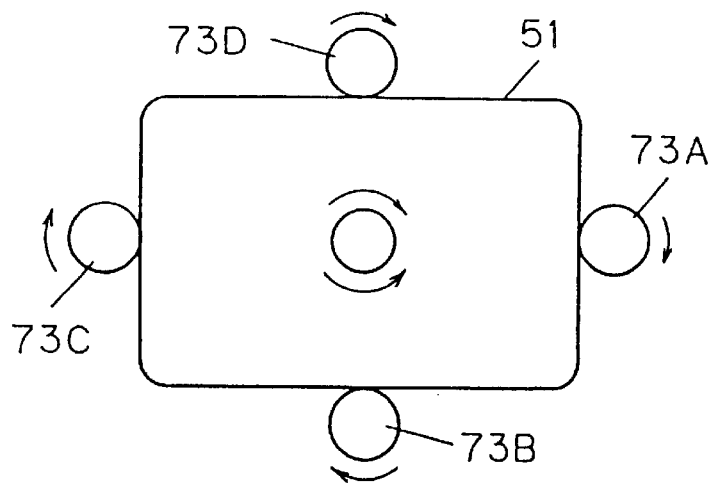
FIG. 29 is an essential plan view of FIG. 28.
Figure 30:
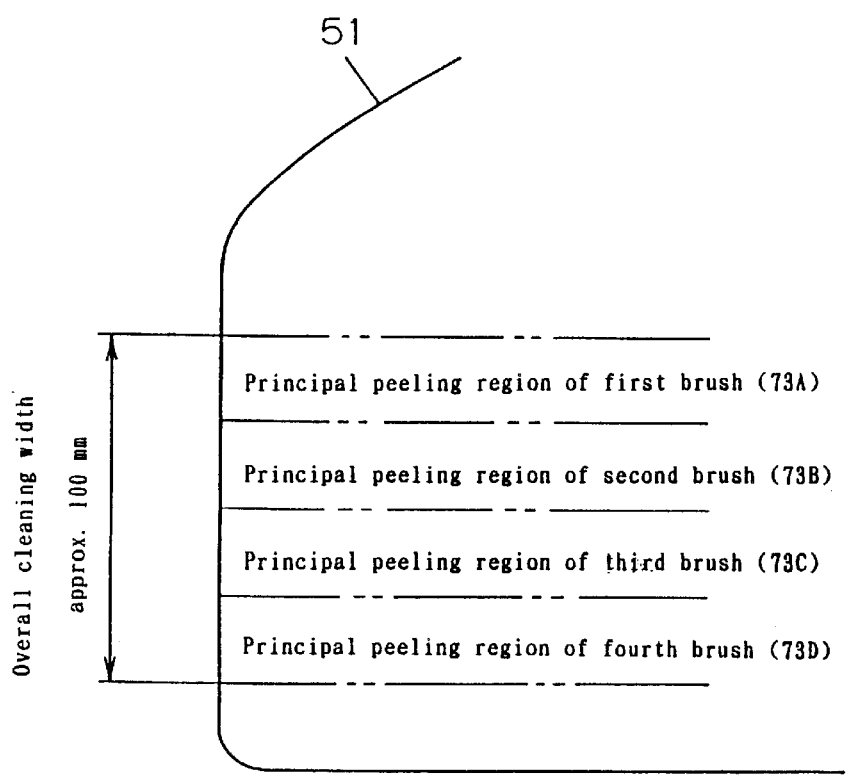
FIG. 30 is an essential side view showing peeling region of each rotary brush for composing FIG. 28.
Figure 31:
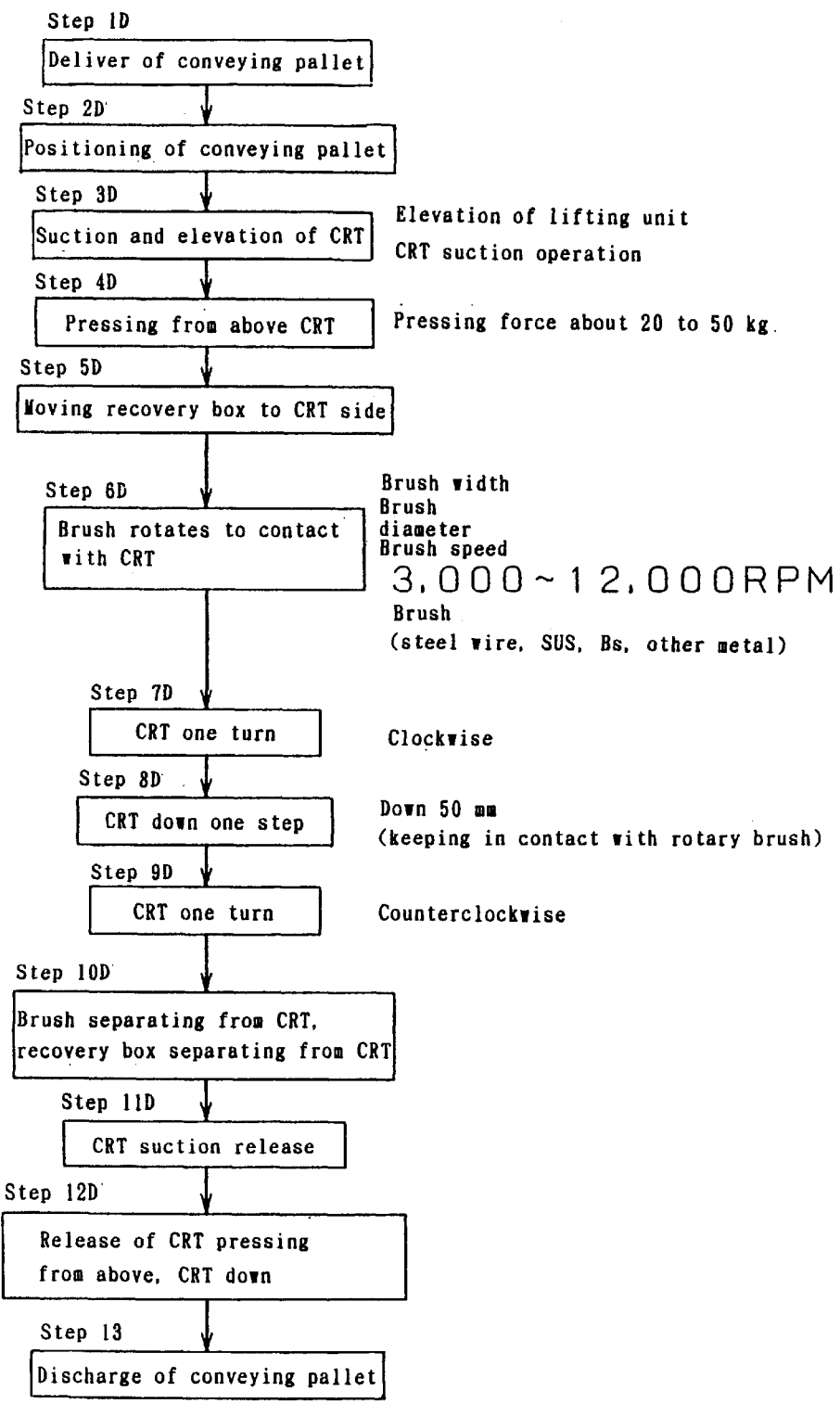
FIG. 31 is a flowchart of adhesive removal process in an embodiment of the invention.
Figure 32:
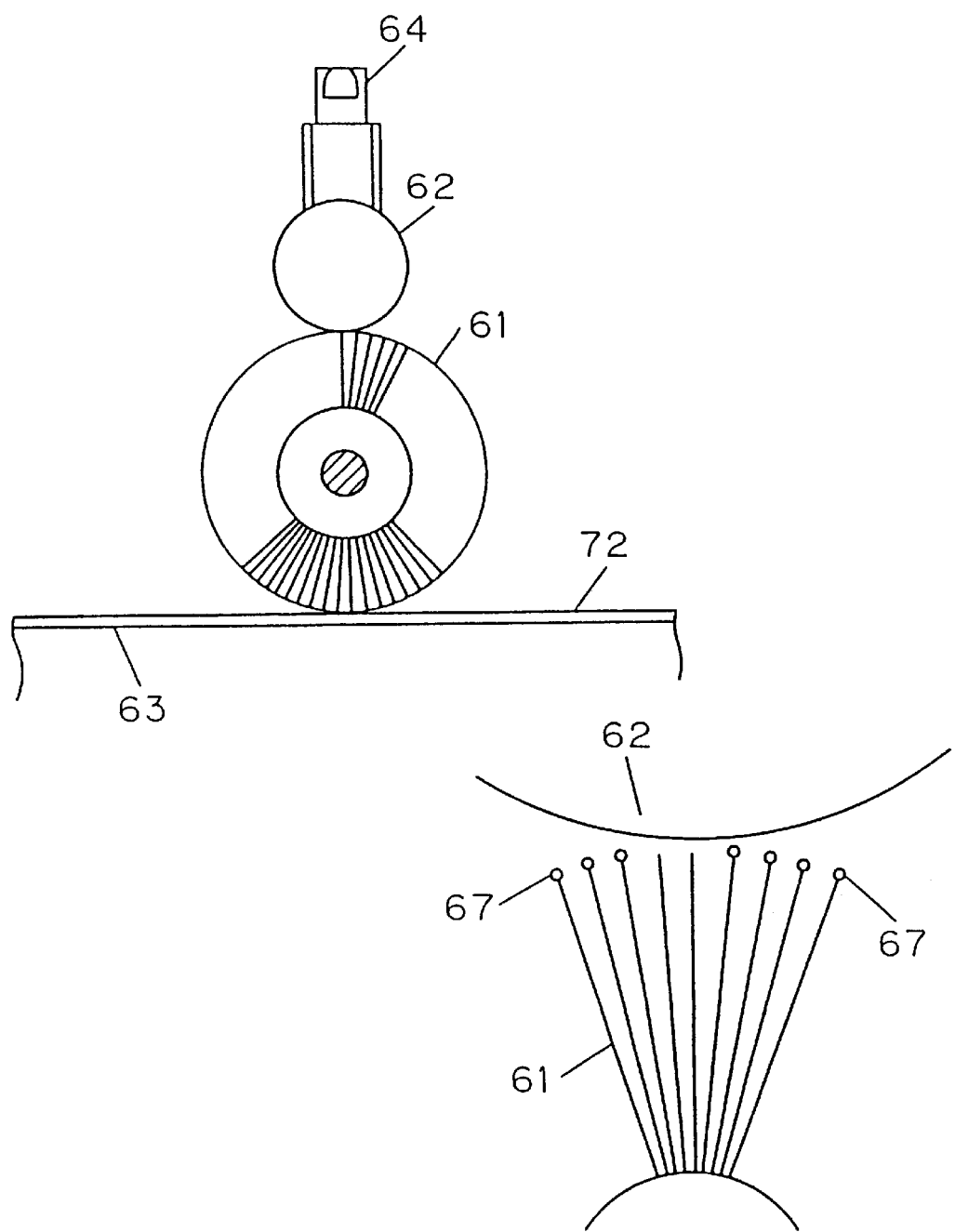
FIG. 32 is an essential plan view of a dresser device in an embodiment of the invention.

FIG. 27 is a conceptual block diagram of deposit removing device of a cathode-ray tube in an embodiment of the invention. FIG. 28 is an essential side view of deposit removing device of a cathode-ray tube in an embodiment of the invention. FIG. 29 is an essential plan view of FIG. 28. FIG. 30 is an essential side view showing peeling region of each rotary brush for composing FIG. 28. FIG. 31 is a flowchart of removal process of residual adhesive agent of adhesive tape or adhesive agent. FIG. 32 is an essential plan view of a dresser device in an embodiment of the invention.

In FIG. 28, a deposit removing device 70 of cathode-ray tube is composed of a rotary brush 73 having steel wires planted radially, a brush rotating motor 74, a CRT suction pad 75 for sucking the tube surface of CRT 51 by vacuum, a CRT rotating motor 76, an elevating unit 77 for elevating and lowering the sucked CRT 51, a brush support arm 78 for supporting the rotary brush 73 and motor 74, a brush moving cylinder 79 for contacting and separating the rotary brush 73 and CRT 51, a tape recovery box 82 of adhesive tape 72 peeled off from the side wall of the CRT 51 by the rotary brush 73, a cylinder 83 for moving the tape recovery box 82, a CRT pressing cylinder 84 for holding the CRT 51 between an exhaust duct 85 for collecting the adhesive tape or brush dust generated in the peeling process of adhesive tape and suction pad 75, a conveying pallet 2 for mounting and conveying CRT, and a conveyor 1 for conveying the conveying pallet 2 in a specified direction. This deposit removing device 70 is installed in a cleaning chamber 80.

As the adhesive tape 72 serving as shock absorber by fixing the metal band to the cathode-ray tube 51, generally, a glass cloth tape impregnated with organic resin such as acrylic adhesive is used.

The rotary brush 73 for peeling and removing the adhesive tape 72 is formed by planting steel wires, stainless steel wires, brass wires, or other metal wires of diameter of 0.2 mm to 0.8 mm, radially and densely on the surface of a hub. The outside diameter of the brush is about 200 mm, and the brush width is about 40 mm. rotating speed of the brush is variable in a range of about 3,000 to about 12,000 rpm. The rotating direction of the rotary brush 73 is reversible in normal and reverse directions.

As shown in FIG. 29, the rotary brush 73 comprises rotary brushes 73A, 73B, 73C, 73D, and these rotary brushes 73 are disposed at four positions corresponding to the side walls of the CRT 51, so as to press against the side wall at a specified pressing force. The arrow in FIG. 29 indicates the rotating direction.

Besides, as shown in FIG. 30, the rotary brushes 73A, 73B, 73C, 73D are disposed by sequentially deviated in the vertical direction of the CRT 51, from the first peeling region to the fourth peeling region. In this arrangement, the adhesive tape can be securely peeled off along the width of about 100 mm.

The conveying pallet 2 for mounting and conveying the CRT 51 has a penetration hole for elevating and lowering the CRT suction pad 75 in the center.

In thus composed removing device 70 of deposits (adhesive tape) on the CRT wall, the operation is described while referring to the flowchart in FIG. 31.

First, at step 1D, the conveying pallet 2 mounting the CRT 51 is delivered into the cleaning chamber of the deposit removing device 70.

Next, at step 2D, the conveying pallet 2 is positioned at a specified position. Consequently, at step 3D, the elevating unit 77 operates, the CRT suction pad 75 supports the panel surface of the CRT and goes up, and the suction pad 75 sucks the panel surface in vacuum and fixes. At step 4D, the CRT pressing cylinder 84 descends, and the cylinder 84 presses near the neck of the electron gun of the CRT 51, and the CRT 51 is held between the pressing cylinder 84 and CRT suction pad 75.

At step 5D, the tape recovery box 82 for collecting the peeled adhesive tape moves forward toward the CRT 51. At step 6D, the brush 73 abuts against the wall of the CRT 51 while rotating at about 10,000 rpm. AT step 7D, in this state, the CRT 51 rotates one turn in the clockwise direction. In succession, at step 8D, with the rotating brush 73 in contact, the CRT 51 descends by about 50 mm in the vertical direction.

Afterwards, at step 9D, the CRT 51 rotates one turn in the counterclockwise direction. In this period, the rotating direction of the brush 73 may be changed over properly.

At step 10D, the recovery box 82 and brush 73 are separated from the CRT 51, and return to the initial position. At step 11D, suction of the CRT bulb surface is released. At step 12D, the CRT suction pad 75 descends. The CRT pressing cylinder 84 moves up. At step 13D, the CRT 51 is mounted on the conveying pallet 2, and is discharged outside of the deposit removing device.

In this embodiment, in the process of peeling work, by lowering the CRT 51 by about 50 mm in the vertical direction and rotating reversely, peeling of the adhesive tape of about 100 mm is more secure.

Moreover, by changing over the rotation of the CRT 51 and brush 73 in normal and reverse directions, deformation of the tip of the brush 73 can be prevented, and a fresh abutting surface of the brush is always obtained.

Besides, as the means for showing always a fresh abutting surface of the brush, the dresser device as shown in FIG. 32 can be used. In FIG. 32, a dresser 62 made of cylindrical porous ceramic or grinding wheel piece is fitted to the tip of the brush 61, so that the tip of the brush 61 coated with the deposit 67 is ground. At this time, by using also coolant such as water from coolant feed means 64, the grinding effect is enhanced while cooling action is achieved.

In FIG. 32, an adhesive tape (adhesive tape and adhesive agent) 72 is adhered to the surface of the side wall 63 of the CRT. As the brush 61 rotates, the deposit 67 formed on the tip of the brush 61 is removed by the dresser 62.

In the embodiment, the planting width and outside diameter of the brushes 61, 73, wire material, rotating speed and others can be set freely.

The presence or absence of the dresser device is also arbitrary. Still more, instead of the lowering action of the CRT at step 9D, the rotary brush side can be moved up and down.

Thus, according to the invention, deposits such as adhesive tape left over on the CRT bulb side can be removed in dry process, efficiently, and in a short time.

(i) Step 12: CRT transfer device

At step 12, after removing the electron gun, metal band, and adhesive tape, the CRT is conveyed to the CRT classification process to be classified into the panel and funnel by CRT transfer device (12) in FIG. 2.

In the execution of each step, the dissembling object is not limited to the video appliances (television receiver, personal computer, or display monitor), but it can be applied to any electronic appliances such as audio appliances and air-conditioners.

Thus, according to the constitution of the invention, disassembling of the television receiver, electric household appliances, and electronic appliances can be realized in dry process. Moreover, the process from detaching of back lid of housing, to peeling and removing of adhesive tape glued to the side of the CRT can be automated or half automated in a simple facility. Hence, classification and regeneration process is facilitated. As a result, the recycling efficiency is enhanced, the environments can be preserved, and the sources can be utilized effectively.

What is claimed is:

1. A disassembling method of an electronic appliance having a housing and plural electronic components installed in said housing, comprising the steps of:

conveying said electronic appliance having said housing and said plural electronic components installed in said housing by a first conveyor, separating said electronic appliance conveyed by said conveyor into said housing, a cathode-ray tube of said plural electronic components, and other electronic components of said plural electronic components, at least on one of said conveyor and a work bench installed near said conveyor, and conveying at least one of said separated housing and said plural electronic components by a second conveyor.

2. A disassembling method of an electronic appliance having a housing and plural electronic components installed in said housing, comprising:

(a) a step of conveying said electronic appliance having a cathode-ray tube of said plural electronic components by a conveyor, (b) a step of transferring said electronic appliance conveyed by said conveyor onto a tiltable first work bench, (c) a step of tilting said first work bench so that the forward side may be lower, (d) a step of removing a portion of said housing from said electronic appliance mounted on said tilted work bench, and forming a first opening, (e) a cleaning step of blowing air shower to said plural electronic components through said first opening, and removing dust deposits from said plural electronic components, (f) a step of transferring said electronic appliance on a tiltable second work bench, (g) a step of tilting said second work bench so that the forward side may be lower, and (h) a step of disassembling and taking out at least one of said plural electronic components from said electronic appliance mounted on said tilted second work bench.

3. A disassembling method of an electronic appliance of claim 2, further comprising:

(i) a step of cutting the bottom plate of said housing having said cathode-ray tube into a U-form through said first opening, and forming a second opening, and (j) a step of separating said cathode-ray tube from said housing by working from said second opening.

4. A disassembling method of an electronic appliance of claim 3, further comprising:

(k) a step of heating a metal band installed around said cathode-ray tube by high frequency so as to expand, and removing said expanded metal band from said cathode-ray tube.

5. A disassembling method of an electronic appliance of claim 4, further comprising:

(l) a step of rotating said cathode-ray tube, fitting a rotary brush to the side of the outer circumference of said rotating cathode-ray tube, and removing the deposit adhered to the circumference of said cathode-ray tube in the mark left over by said removed metal band, by said rotary brush.

6. A disassembling method of an electronic appliance of claim 3, further comprising:

(k) a step of distinguishing whether said separated cathode-ray tube has a safety panel at its front side or not, and (l) a step of classifying into cathode-ray tubes having said safety panel and cathode-ray tubes not having said safety panel.

7. A disassembling method of an electronic appliance of claim 6, further comprising:

(m) a step of cutting the circumference of display unit of said cathode-ray tube not having said safety panel into a groove form, heating, and separating said display unit from said cathode-ray tube.

8. A disassembling method of an electronic appliance of claim 2, further comprising:

(i) a step of separating at least said one electronic component of taken out of said electronic appliance in a different step.

9. A disassembling method of an electronic appliance of claim 2, wherein said cathode-ray tube is installed so as to be exposed to one side of said housing, and the step for removing said one portion of said housing at said step (c) is a step for removing a back cover.

10. A disassembling method of an electronic appliance having a housing including a plate forming at least one side selected from the group consisting of top, bottom and side, and plural electronic components installed in said housing, comprising:

(a) a step of processing said plate by at least one process selected from the group consisting of end mill processing, laser processing, and water jet processing, and cutting and separating, and (b) a step of removing a part of said separated plate, and forming an opening.

11. A disassembling method of an electronic appliance of claim 10, wherein at least said one plate of said top, bottom and side is cut nearly in an U-form.

12. A disassembling method of an electronic appliance of claim 10, further comprising:

(c) a step of disassembling at least one of said plural electronic components through said opening, and taking out said disassembled electronic component.

13. A disassembling method of an electronic appliance having a housing including a plate forming at least one side selected from the group consisting of top, bottom and side, and plural electronic components installed in said housing, comprising:

(a) a step of cutting said plate on at least one side of said top, bottom and side, and separating, and (b) a step of removing a part of said separated plate, and forming an opening.

14. A disassembling method of an electronic appliance of claim 13, further comprising:

(c) a step of removing a back cover from said housing, and forming other opening, wherein said cutting step at said step (a) cuts said bottom in a U-form through said other opening by end mill processing.

15. A disassembling method of an electronic appliance of claim 14, wherein said plate is cut in said U-form through at least one of a first ridge portion at intersection of said top and said side, and a second ridge portion at intersection of said bottom and said side.

16. A disassembling method of an electronic appliance of claim 13, wherein said plural electronic components include a cathode-ray tube of a television receiver, and a coupling member for coupling said cathode-ray tube, further comprising:

(c) a step of taking out said cathode-ray tube through said opening.

17. A disassembling method of an electronic appliance of claim 13, wherein said plural electronic components include a cathode-ray tube of a television receiver, and a coupling member for coupling said cathode-ray tube, further comprising:

(c) a step of taking out said coupling member through said opening, and (d) a step of taking out said cathode-ray tube from said opening after removing said coupling member.

18. A disassembling method of an electronic appliance having a cathode-ray tube, and a metal band installed around said cathode-ray tube, comprising:
(a) a step of supporting a front side of said cathode-ray tube,
(b) a step of applying a pressing load to said metal band,
(c) a step of heating said metal band while applying said pressing load,
(d) a step of taking out said metal band from said cathode-ray tube, wherein said metal band is expanded by heating of said metal band, and said metal band is separated from said cathode-ray tube by expansion of said metal band, and
(e) a step of fitting a rotary brush so as to contact a deposit adhering to the circumference of said cathode-ray tube, said deposit being left over after the removal of said metal band, said rotary brush removing said deposit.

19. A disassembling method of an electronic appliance of claim 18, wherein said step of heating is a step of heating by using high frequency induction heating means, and the output of said high frequency induction heating means is in a range of about 2 KW to 60 KW.

20. A disassembling method of an electronic appliance of claim 18, wherein said step of heating is executed while applying a pressing load in a range of about 4 Kg to about 40 Kg to a tab fitted to said metal band.

21. A disassembling method of an electronic appliance of claim 18,
wherein said electronic appliance further includes a resin member installed between said cathode-ray tube and said metal band, said resin member is softened and metal band is expanded as said metal band is heated, and said metal band is separated from said cathode-ray tube by softening of said resin member and expansion of said metal band.

22. A disassembling method of an electronic appliance of claim 18,
wherein said rotary brush has plural metal wires, and said deposit is moved from said cathode-ray tube to adhere to the ends of said plural metal wires, and removed.

23. A disassembling method of an electronic appliance of claim 22, further comprising:
(d) a step of fitting a dresser to contact with said deposit adhered to said ends of said metal wires of said rotary brush, shaving off the ends of said rotary brush, and removing said deposit from said metal wires.

24. A disassembling method of an electronic appliance of claim 23,
wherein said dresser is formed of a ceramic material having a stiffer property than said metal wires.

25. A disassembling method of an electronic appliance having a cathode-ray tube, and a metal band installed around said cathode-ray tube, comprising:
(a) a step of lifting said cathode-ray tube while supporting the front side of said cathode-ray tube, wherein said cathode-ray tube is mounted on a conveying pallet,
(b) a step of positioning said cathode-ray tube in an induction heating coil of high frequency heating means,
(c) a step of heating by applying said high frequency heating means to said metal band, while applying a pressing load to a tab fitted to said metal band, and
(d) a step of detaching said metal band from said cathode-ray tube.

26. A disassembling method of an electronic appliance having a cathode-ray tube, comprising:
(a) a distinguishing step of distinguishing whether a safety panel is installed or not at the front side of said cathode-ray tube, and
(b) a step of classifying into cathode-ray tubes having said safety panel and cathode-ray tubes not having said safety panel, according to said distinguishing step,
wherein said distinguishing step is characterized by distinguishing presence or absence of said safety glass by measuring the distance from a distance sensor installed in the forward direction of a fluorescent screen of said cathode-ray tube to said fluorescent screen.

27. A disassembling method of an electronic appliance having a cathode-ray tube, comprising:
(a) a distinguishing step of distinguishing whether a safety panel is installed or not at the front side of said cathode-ray tube, and
(b) a step of classifying into cathode-ray tubes having said safety panel and cathode-ray tubes not having said safety panel, according to said distinguishing step,
wherein said distinguishing step is characterized by distinguishing presence or absence of said safety glass by measuring the distance from a distance sensor installed in the forward direction of a fluorescent screen of said cathode-ray tube to said fluorescent screen, and by measuring the size of said fluorescent screen of said cathode-ray tube.

28. A disassembling method of an electronic appliance having a cathode-ray tube, comprising:
(a) a distinguishing step of distinguishing whether a safety panel is installed or not at the front side of said cathode-ray tube, and
(b) a step of classifying into cathode-ray tubes having said safety panel and cathode-ray tubes not having said safety panel, according to said distinguishing step,
wherein said distinguishing step is executed by mounting a fluorescent screen of said cathode-ray tube on a pallet having an opening, sot that part of said fluorescent screen may coincide with said opening.

29. A disassembling method of an electronic appliance of claim 26, or 28 further comprising:
(c) a step of mounting cathode-ray tubes having said safety panel and cathode-ray tubes not having said safety panel on other different conveyors respectively.

30. A disassembling method of an electronic appliance having a housing and plural electronic components installed in said housing, comprising:
(a) a step of mounting said electronic appliance in a container having high pressure gas injection means and exhaust means, and
(b) a cleaning step for removing dust deposits on said plural electronic components in said container.

31. A disassembling method of an electronic appliance of claim 30,
wherein said cleaning step is a step of blowing air shower from said high pressure gas injection means to said electronic appliance to separate said dust from said electronic components, and removing said separated dust by said exhaust means.

32. A disassembling method of an electronic appliance of claim 30,
wherein said electronic appliance is mounted on a conveying pallet mounted on a conveyor.

33. A disassembling method of an electronic appliance having a housing and plural electronic components installed in said housing, comprising:

(a) a step of mounting said electronic appliance on a conveying pallet, and conveying by a conveyor, (b) a step of lowering a cover container having air shower injection means and exhaust duct so as to cover said electronic appliance conveyed by said conveyor, and (c) a step of blowing air shower of said air shower injection means to said electronic appliance in said container, separating dust deposits from said electronic components, and removing said dust through said exhaust duct.

34. A disassembling method of an electronic appliance having a housing and plural electronic components installed in said housing, comprising:

(a) a step of transferring said electronic appliance conveyed on a conveyor onto a tiltable work bench, (b) a step of tilting said work bench so as to be lower at the front side, and (c) a step of disassembling said electronic appliance mounted on said tilted work bench.

35. A disassembling method of an electronic appliance of claim 34, wherein said step of disassembling said electronic appliance is a step of detaching at least part of said housing from said electronic appliance, and forming an opening.

36. A disassembling method of an electronic appliance of claim 35, further comprising:

(d) a cleaning step of removing dust deposits from said electronic components through said opening.

37. A disassembling method of an electronic appliance of claim 36, further comprising:

(e) a step of mounting said electronic appliance having said opening on other tiltable work bench, tilting said other work bench, and removing at least one of said plural electronic components being rid of said dust through said opening.

38. A disassembling method of an electronic appliance of claim 37, further comprising:

(f) a step of processing a bottom plate of said housing by end mill, cutting, and forming other opening.

39. A disassembling method of an electronic appliance of claim 38, wherein one of the others of said plural electronic components has a cathode-ray tube and a metal band installed around said cathode-ray tube, and further comprising:

(g) a step of heating said metal band at high frequency and removing said metal band.

40. A disassembling method of an electronic appliance of claim 39, wherein said cathode-ray tube has a safety panel installed at the front side of said cathode-ray tube, and further comprising:

(h) a step of distinguishing presence or absence of installation of said safety panel.

41. A disassembling method of an electronic appliance of claim 40, wherein said step of distinguishing presence or absence of installation of said safety panel is characterized by measuring, using distance sensor, the distance from a fluorescent screen of said cathode-ray tube to the distance sensor installed in the forward direction of said fluorescent screen.

42. A disassembling method of an electronic appliance of claim 40, further comprising:

(i) a step of fitting a rotary brush to contact with said cathode-ray tube, and removing deposits from the circumference of said cathode-ray tube.

43. A disassembling method of an electronic appliance of claim 42, further comprising:

(j) a step of cutting said cathode-ray tube by a disk grinder, and removing an electron gun from said cathode-ray tube.

44. A disassembling method of an electronic appliance of claim 34, wherein said conveyor has a conveying pallet mounted on the conveyor, and said electronic appliance is mounted on said conveying pallet.

45. A disassembling apparatus of an electronic appliance having a housing and plural electronic components installed in said housing, comprising:

a first conveyor for conveying said electronic appliance, separating means for separating said electronic appliance into housing and plural electronic components, and a second conveyor for conveying at least one of said separated housing and plural electronic components.

46. A disassembling apparatus of an electronic appliance comprising:

(a) a pallet for mounting and conveying an electronic appliance having a housing and plural electronic components installed in said housing, (b) a first conveyor for conveying said pallet, and (c) a tiltable work bench installed near said first conveyor, having a frame, a small conveyor installed on said frame, a stopper formed on said frame, and automatic tilting means for tilting said frame about one end of said frame.

47. A disassembling apparatus of an electronic appliance of claim 46, further comprising:

(d) a cleaning device for generating an air shower for removing dust deposits from said plural electronic components.

48. A disassembling apparatus of an electronic appliance of claim 47, further comprising:

(e) cutting means for cutting off a bottom plate of said housing by end mill processing, and forming an opening in said housing.

49. A disassembling apparatus of an electronic appliance of claim 48, wherein said electronic components include a cathode-ray tube and a metal band installed around said cathode-ray tube, and further comprising:

(f) a removing device for dismounting said metal band from said cathode-ray tube.

50. A disassembling apparatus of an electronic appliance of claim 49, wherein said removing device includes pressing means for applying a pressing load to said metal band, and high frequency heating means for heating said metal band.

51. A disassembling apparatus of an electronic appliance of claim 49, further comprising:

(g) a distinguishing device for judging whether a safety panel is installed or not at the front side of said cathode-ray tube.

52. A disassembling apparatus of an electronic appliance of claim 51, wherein said distinguishing device includes means for measuring the outside dimension of said cathode-ray tube, and means for measuring the distance from a distance sensor installed at a specified position from a fluorescent screen of said cathode-ray tube to said fluorescent screen.

53. A disassembling apparatus of an electronic appliance of claim 51, further comprising:
(h) a removing means for removing deposits from the circumference of said cathode-ray tube.

54. A disassembling apparatus of an electronic appliance of claim 53,
wherein said removing device includes means for rotating while supporting said cathode-ray tube, and a rotary brush installed so as to be capable of contacting with said circumference of said cathode-ray tube, and said rotary brush removes said deposits.

55. A disassembling apparatus of an electronic appliance of claim 53, further comprising:
(i) a dresser device for removing deposits from the tip of rotary brush of said removing device.

56. A disassembling apparatus of an electronic appliance of claim 53, further comprising:
(j) a second conveyor for conveying said electronic components disassembled from said electronic appliance.

57. A disassembling apparatus of an electronic appliance comprising:
(a) a conveyor for conveying an electronic appliance including a housing having at least one selected from the group consisting of top plate, bottom plate and side plate, and plural electronic components installed in said housing, and
(b) cutting and processing means for cutting at least one selected from the group consisting of said top plate, bottom plate, and side plate, and separating, and opening.

58. A disassembling apparatus of an electronic appliance of claim 57, further comprising:
(c) a conveying pallet mounted on said conveyor,
wherein said electronic appliance is conveyed while being mounted on said conveying pallet.

59. A disassembling apparatus of an electronic appliance of claim 58, further comprising:
(d) establishing means for establishing the position of said conveyed electronic appliance.

60. A disassembling apparatus of an electronic appliance of claim 59, further comprising:
(e) measuring means for measuring the position of said established electronic appliance.

61. A disassembling apparatus of an electronic appliance of claim 60,
wherein said measuring means is at least one of laser sensor and ultrasonic sensor.

62. A disassembling apparatus of an electronic appliance of claim 60,
wherein said measuring means has a role of measuring the position in each direction of mutually intersecting X-axis, Y-axis and Z-axis.

63. A disassembling apparatus of an electronic appliance of claim 57,
wherein said cutting and processing means is at least one selected from the group consisting of end mill processing, laser processing, and water jet processing.

64. A disassembling apparatus of an electronic appliance of claim 57,
wherein said cutting and processing means is end mill processing, and said bottom plate is cut by said end mill processing.

65. A disassembling apparatus of an electronic appliance comprising:
(a) means for feeding an electronic appliance including electronic components, a cathode-ray tube, and a metal band installed around said cathode-ray tube,
(b) pressing means for applying a pressing load to said metal band, and
(c) high frequency heating means for heating said metal band,
wherein said metal band is expanded as said metal band is heated, and said metal band is separated from said cathode-ray tube along with expansion and pressing of said metal band.

66. A disassembling apparatus of an electronic appliance of claim 65,
wherein said high frequency heating means is high frequency induction heating means.

67. A disassembling apparatus of an electronic appliance of claim 65,
wherein said high frequency heating means includes a high frequency induction coil, and further comprising:
(d) lifting means for lifting said cathode-ray tube to the inside height of said high frequency induction coil,
wherein said metal band is heated by induction heat by said high frequency induction coil.

68. A disassembling apparatus of an electronic appliance of claim 65,
wherein said means for feeding said electronic appliance is conveying means having a conveying pallet, and said electronic appliance is mounted on said conveying pallet.

69. A disassembling apparatus of an electronic appliance comprising:
(a) a first conveyor for conveying an electronic appliance including a first cathode-ray tube not having safety panel, and a second cathode-ray tube having a safety panel in the forward direction of a fluorescent screen, and
(b) a distinguishing device for distinguishing said first cathode-ray tube not having said safety panel from said second cathode-ray tube having said safety panel.

70. A disassembling apparatus of an electronic appliance of claim 69,
wherein said distinguishing device includes a distance sensor installed in a further forward direction of said forward direction of said fluorescent screen, said distance sensor has a function of measuring the distance from said distance sensor to said fluorescent screen, and said first cathode-ray tube not having said safety panel from said second cathode-ray tube having said safety panel are distinguished by said distance from said distance sensor to said fluorescent screen.

71. A disassembling apparatus of an electronic appliance of claim 70,
wherein said distance sensor is a sensor making use of at least one of laser beam and ultrasonic wave.

72. A disassembling apparatus of an electronic appliance of claim 69, further comprising:
(c) a pallet forming an opening for mounting said electronic appliance on,
wherein said fluorescent screen of said first cathode-ray tube and said fluorescent screen of said second cathode-ray tube are mounted on said pallet having said opening, in a state so that part of said fluorescent screen may coincide with said opening.

73. A disassembling apparatus of an electronic appliance of claim 69, wherein said distinguishing device includes a distance sensor installed in a further forward direction of said forward direction of said fluorescent screen, and size measuring means for measuring the size of said fluorescent screen, installed in the direction of each side of said first cathode-ray tube and said second cathode-ray tube, and said first cathode-ray tube not having said safety panel and said second cathode-ray tube having said safety panel are distinguished on the basis of the data measured by said distance sensor and said size measuring means.

74. A disassembling apparatus of an electronic appliance comprising:

(a) a conveyor for conveying an electronic appliance having plural electronic components, (b) a tiltable work bench installed near said conveyor, and (c) transfer means for transferring said electronic appliance conveyed by said conveyor onto said work bench.

75. A disassembling apparatus of an electronic appliance of claim 74, further comprising:

(d) a conveying pallet, wherein said electronic appliance is conveyed while being mounted on said conveying pallet.

76. A disassembling apparatus of an electronic appliance of claim 74, wherein said work bench includes a tiltable frame, tilting means for tilting said frame, and a small conveyor installed on said frame, said electronic appliance is transferred onto said small conveyor, and said electronic appliance mounted on said small conveyor is tilted when said frame is tilted.

77. A disassembling apparatus of an electronic appliance of claim 76, wherein said tilting means has a support shaft at one end of said frame, and elevatable automatic tilting means at other end.

78. A disassembling apparatus of an electronic appliance of claim 77, wherein said frame has a stopper, and said stopper has a function for preventing said electronic appliance from dropping out when said frame is tilted.

79. A disassembling apparatus of an electronic appliance comprising:

(a) a conveyor for conveying an electronic appliance having plural electronic components, and (b) a cleaning device for removing dust deposits from said electronic appliance, wherein said cleaning device includes a cover body to be installed so as to cover said electronic appliance mounted on said conveyor, means for injecting an air shower in said cover body, and an exhaust duct for sucking and removing separated dust, said air shower blows off and separates said dust from said electronic appliance covered by said cover body, and said separated dust is removed from said exhaust duct.

80. A disassembling apparatus of an electronic appliance comprising:

(a) a conveyor for conveying an electronic appliance having a cathode-ray tube, and (b) a rotary brush installed so as to contact with the circumference of said cathode-ray tube for removing deposits adhering to said cathode-ray tube.

81. A disassembling apparatus of an electronic appliance of claim 80, wherein said rotary brush is a plurality of rotary brushes, and each one of said plurality of rotary brushes is installed at a specific interval on said circumference of said cathode-ray tube so as to contact with each other.

82. A disassembling apparatus of an electronic appliance of claim 80, wherein said rotary brush has plural metal wires installed radially.

83. A disassembling apparatus of an electronic appliance of claim 80, further comprising:

(c) rotating means for rotating while supporting said cathode-ray tube, wherein said rotary brush contacts with said deposits adhered on the circumference of said cathode-ray tube, while rotating said cathode-ray tube, thereby removing said deposits.

84. A disassembling apparatus of an electronic appliance of claim 83, further comprising:

(d) a dresser for removing said deposits adhering to the tip of said rotary brush along with removal of said deposits, wherein the tip of said rotary brush having deposits contacts with said dresser, and said tip of said rotary brush is shaved off, and said deposits are removed at the same time.

85. A disassembling apparatus of an electronic appliance of claim 84, wherein said dresser is formed of a ceramic material having a stiffer property than said metal wires.

* * * * *